Figure 1:
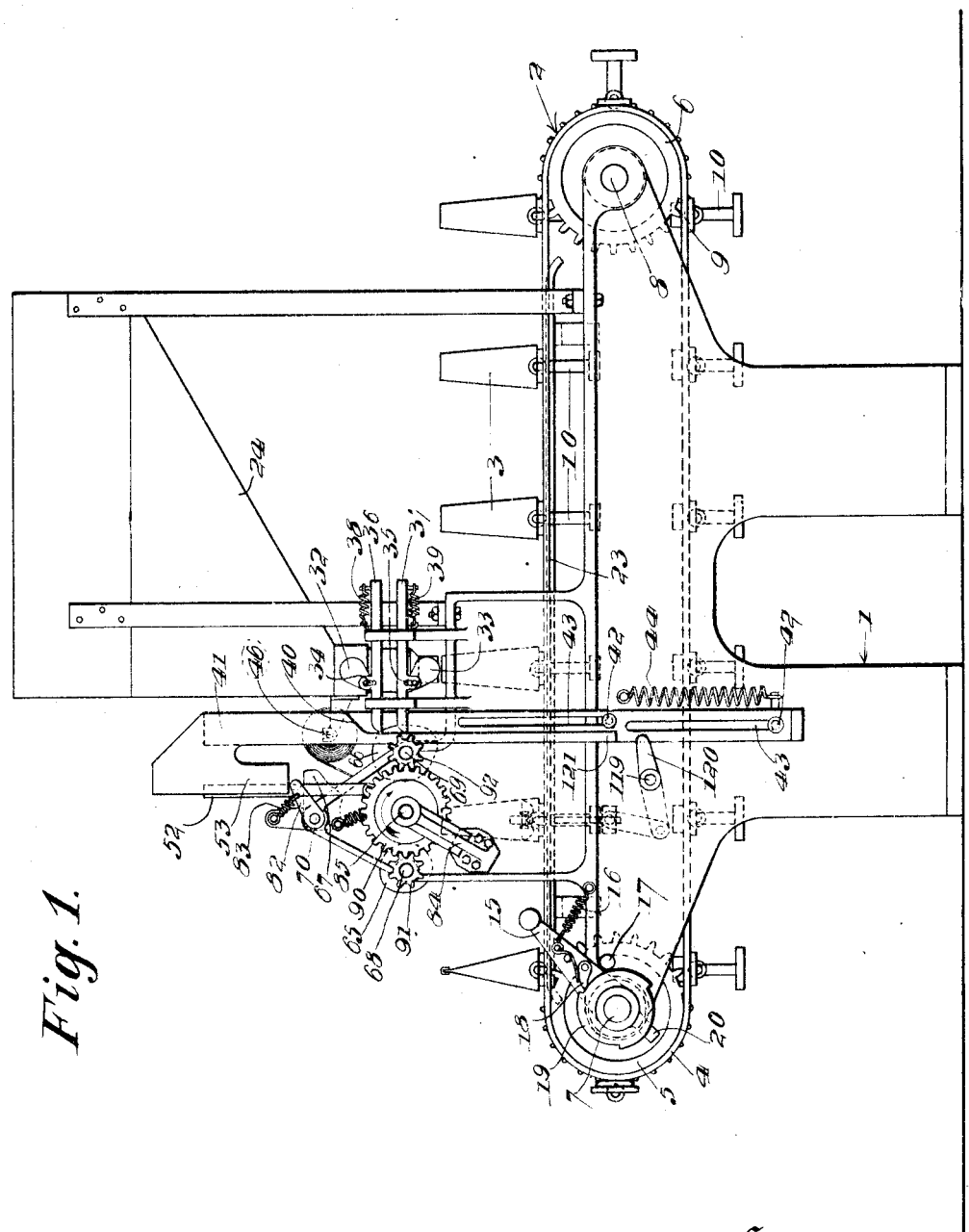

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 1.

Witnesses:
Lottie M. Fox.
Bertha von Behrens.

Inventor:
John L. Zeiler,
By Hugh N. Wagner,
His Attorney.

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 2.

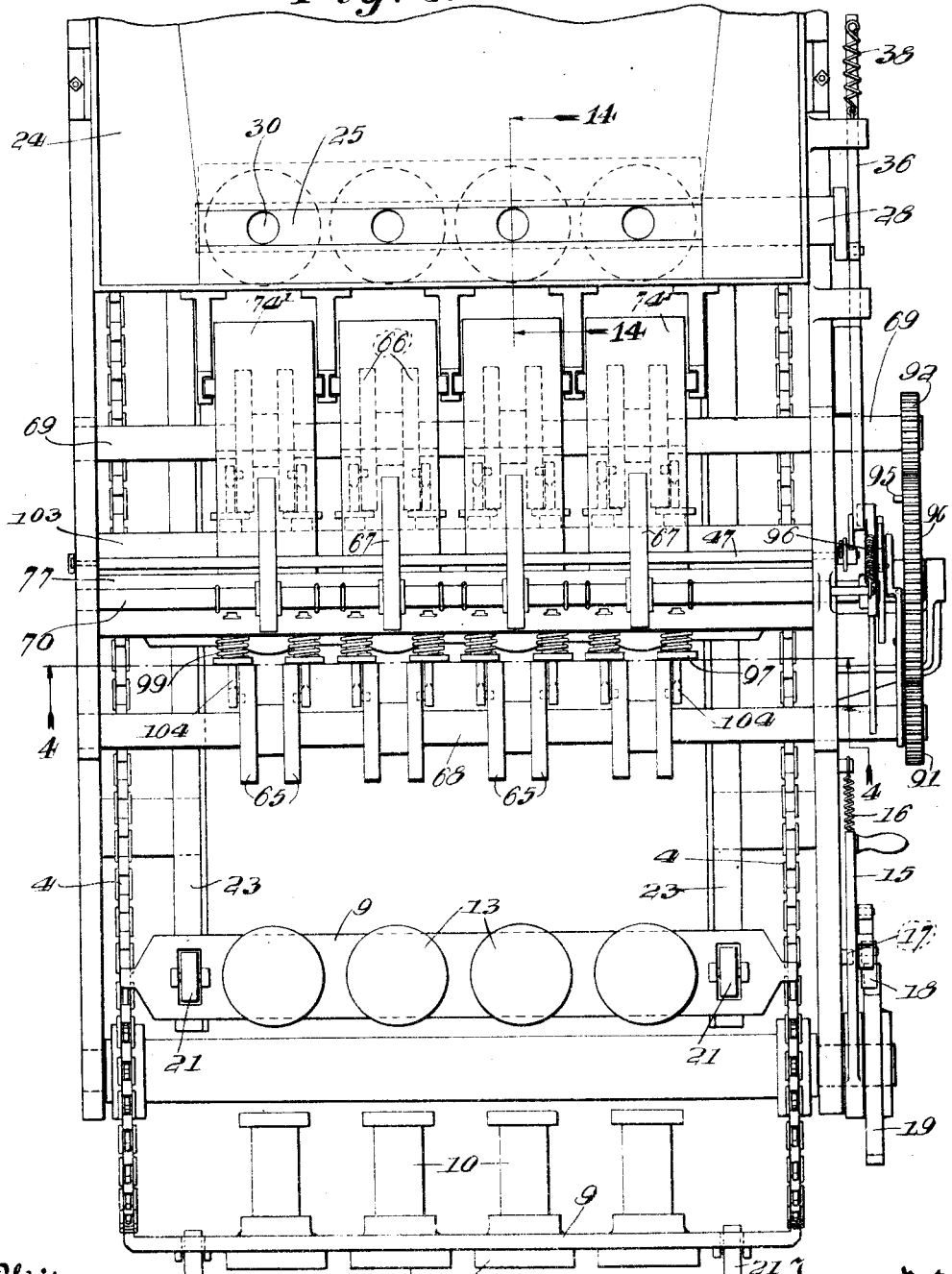

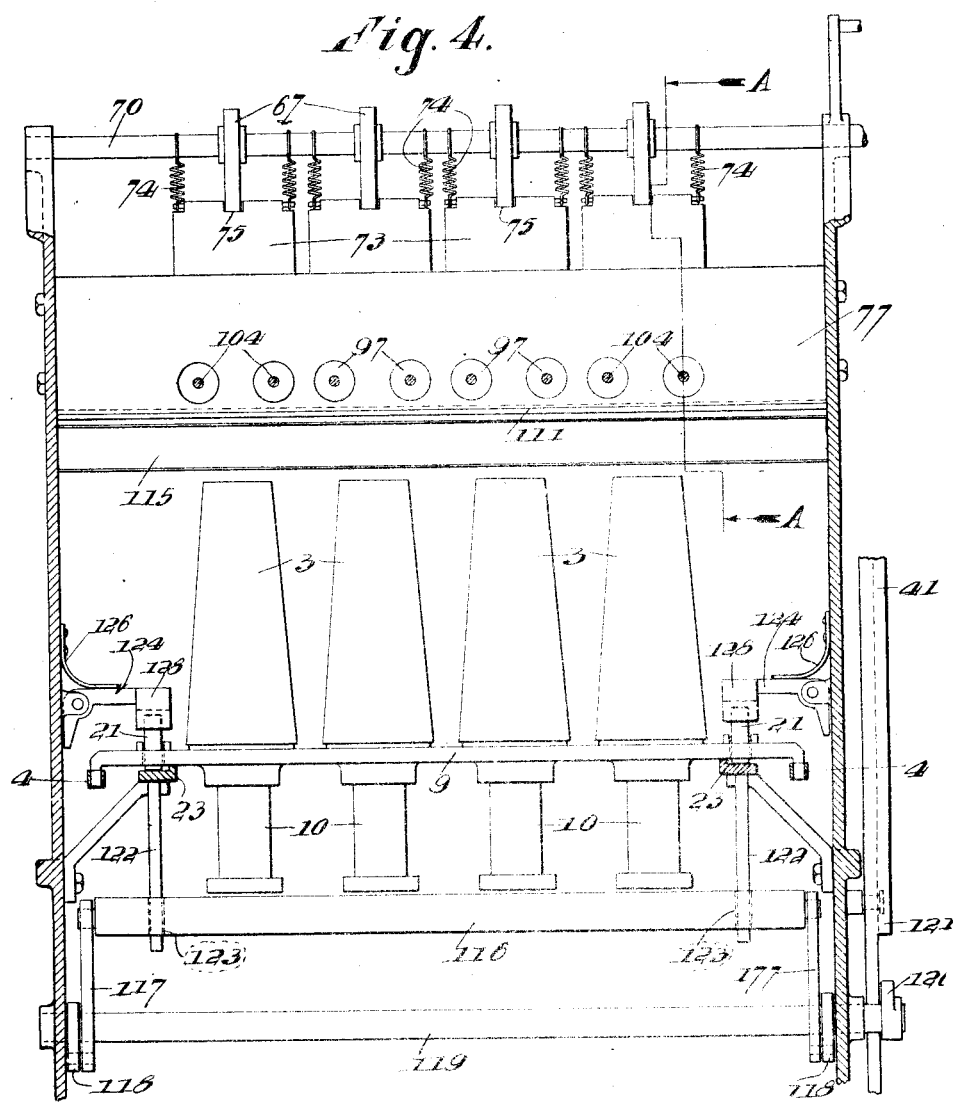

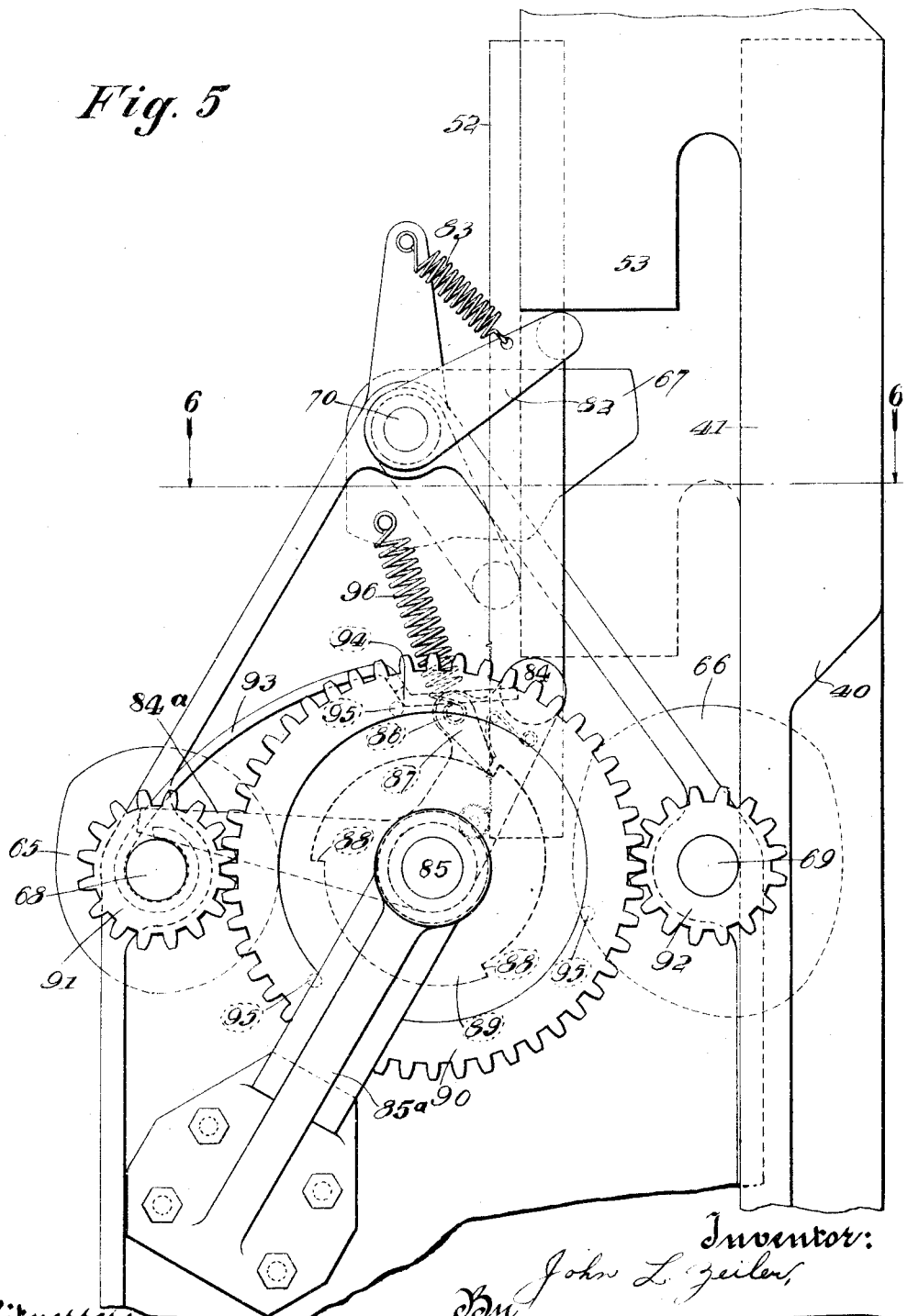

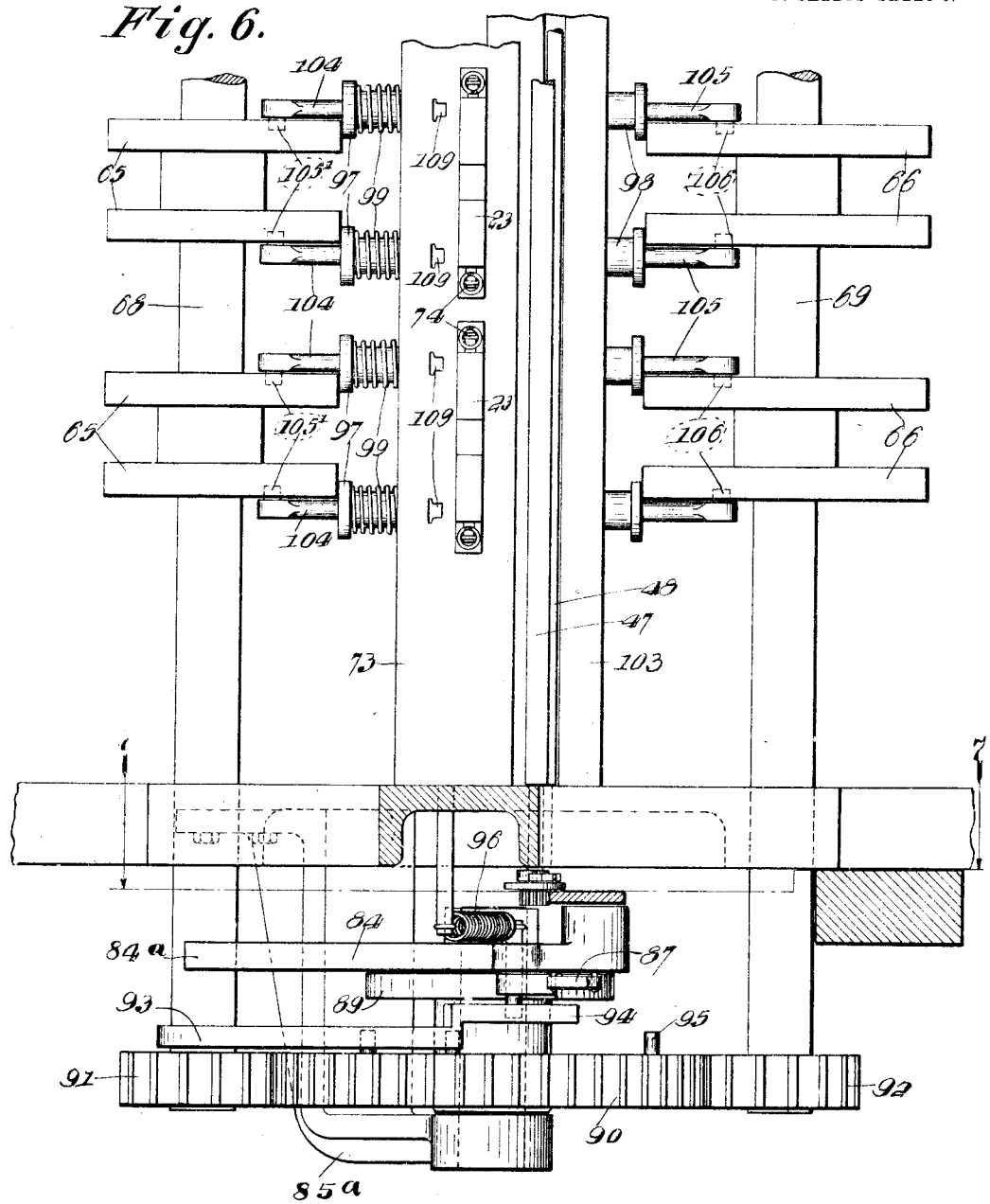

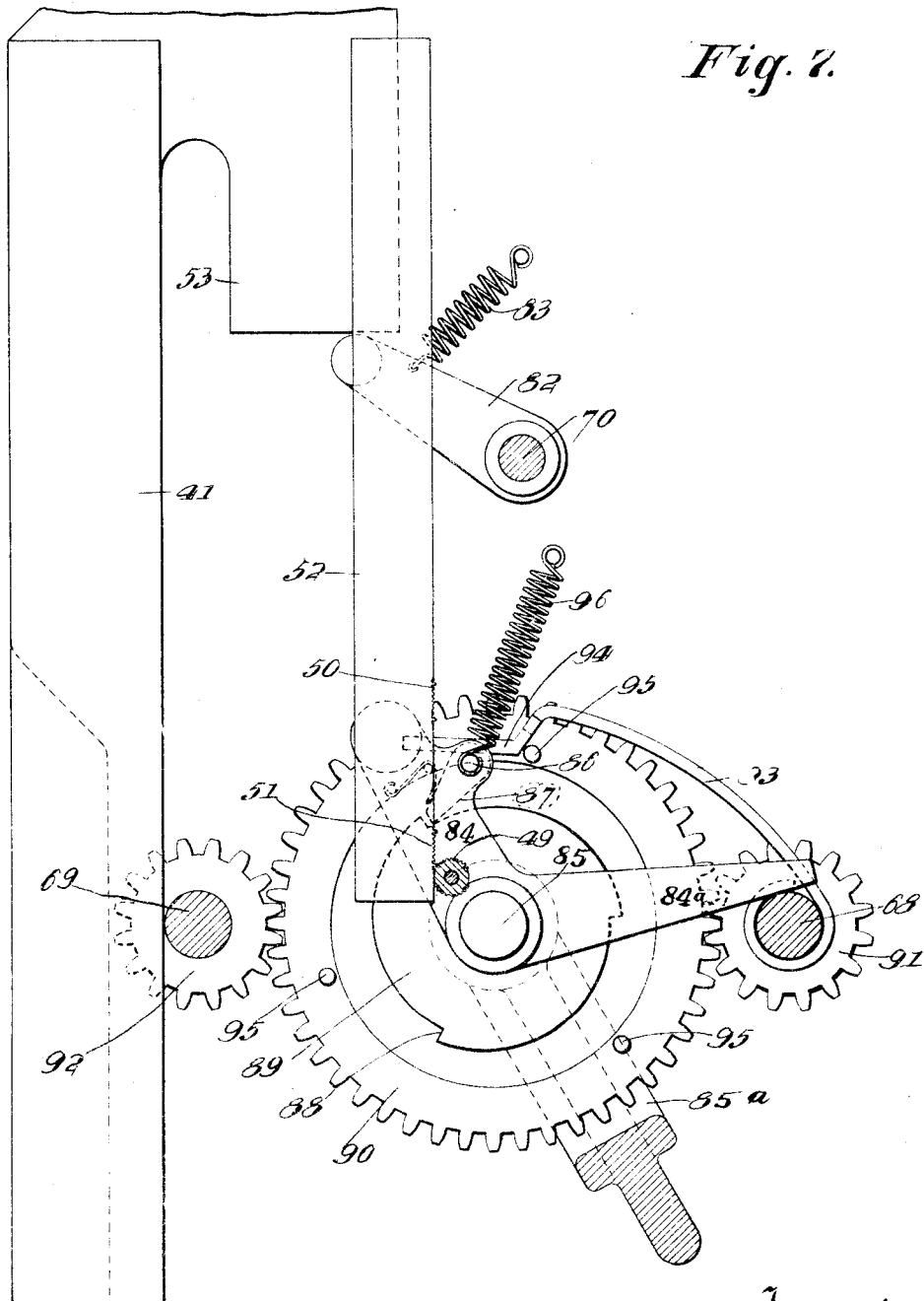

J. L. ZEILER.
APPARATUS FOR CLOSING AND SEALING BOTTLE TOPS.
APPLICATION FILED AUG. 21, 1911.
1,050,325.
Patented Jan. 14, 1913.
20 SHEETS—SHEET 8.
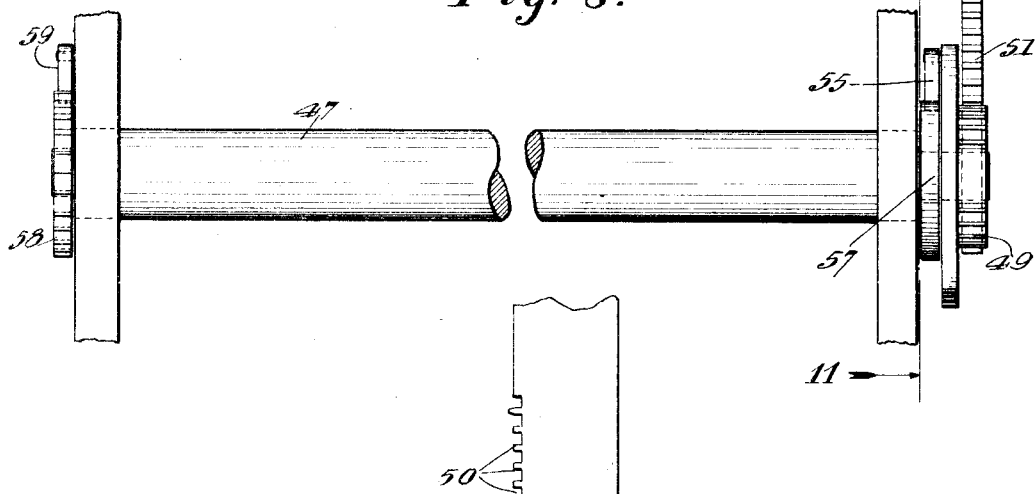
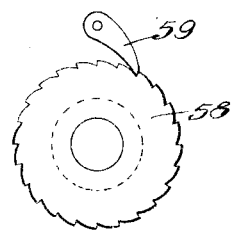
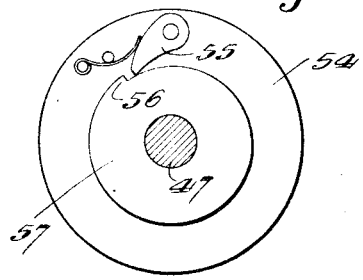
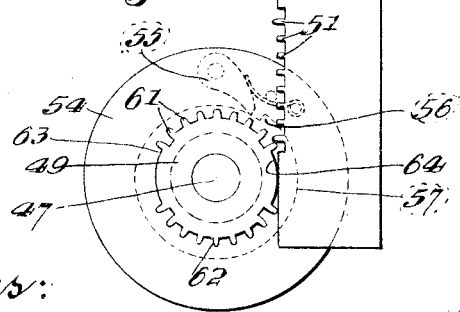
Witnesses:
Lottie M. Fox.
Bertha von Behrens.
Inventor:
John L. Zeiler,
By Hugh K. Wagner
His Attorney.

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 9.

Witnesses:
Lottie M. Fox.
Bertha von Behrens.

Inventor:
John L. Zeiler,
By Hugh K. Wagner
His Attorney.

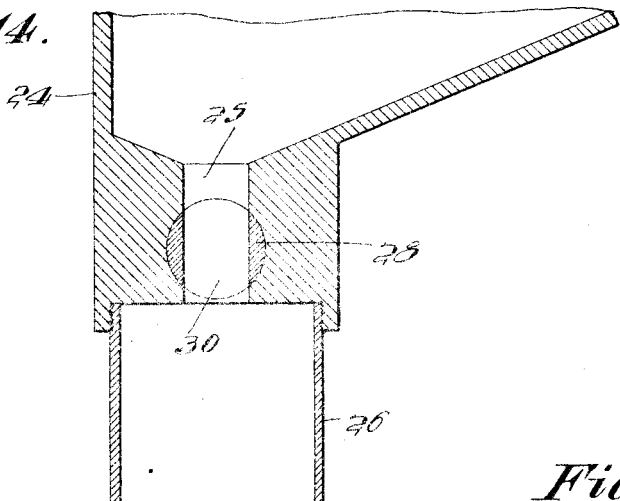
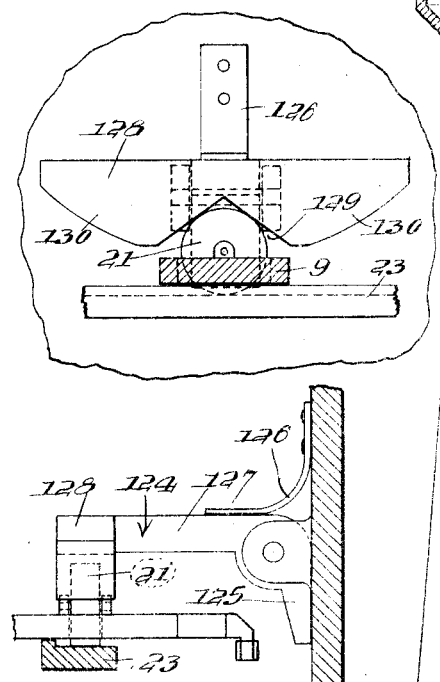

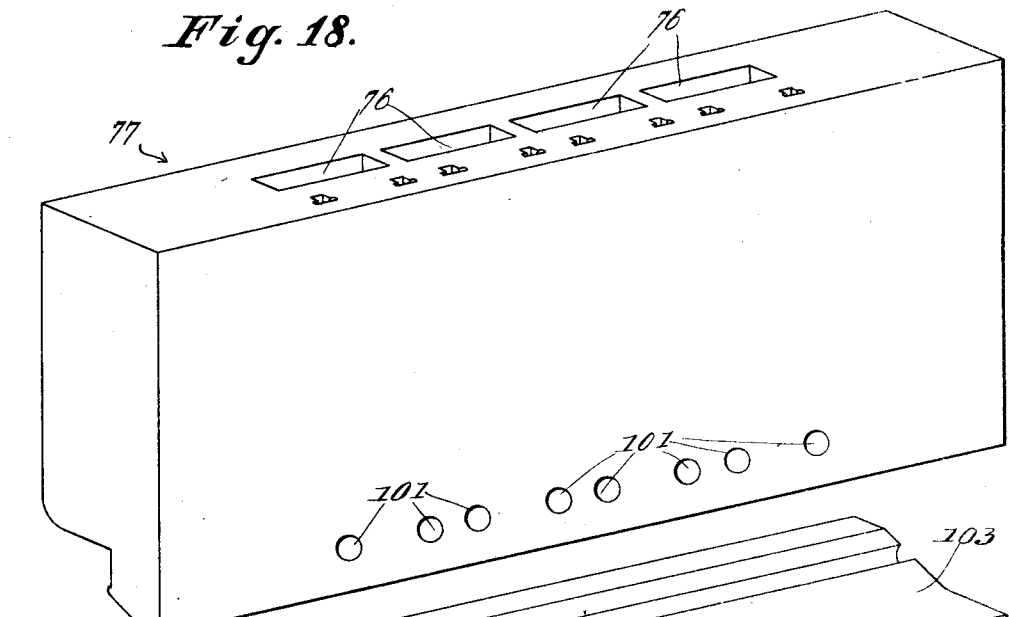
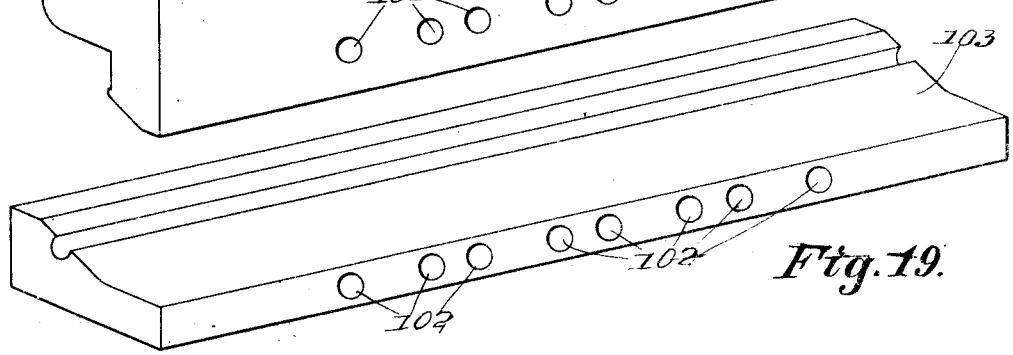
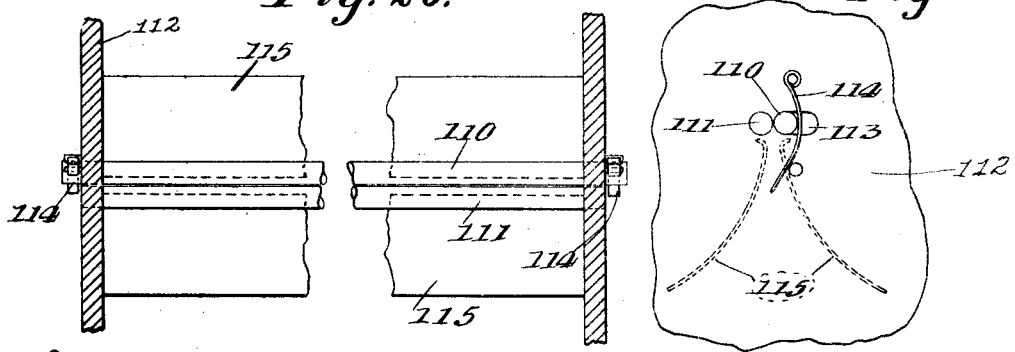

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 12.

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 14.

J. L. ZEILER.
APPARATUS FOR CLOSING AND SEALING BOTTLE TOPS.
APPLICATION FILED AUG. 21, 1911.

1,050,325.

Patented Jan. 14, 1913.
20 SHEETS—SHEET 20.

Witnesses:
Lottie M. Fox.
Bertha von Behrens.

Inventor:
John L. Zeiler,
By Hugh K. Wagner
His Attorney.

UNITED STATES PATENT OFFICE.

JOHN L. ZEILER, OF CLAYTON, MISSOURI.

APPARATUS FOR CLOSING AND SEALING BOTTLE-TOPS.

1,050,325.  Specification of Letters Patent.  Patented Jan. 14, 1913.

Application filed August 21, 1911. Serial No. 645,267.

*To all whom it may concern:*

Be it known that I, JOHN L. ZEILER, a citizen of the United States, residing at the city of Clayton, in the county of St.
Louis and State of Missouri, have invented certain new and useful Improvements in Apparatus for Closing and Sealing Bottle-Tops, of which the following is a specification.
This invention has reference to apparatus for closing and sealing bottle tops, and is designed primarily for operating upon or in conjunction with that type of bottle which is constructed of paper or similar sheet material, and is especially intended for holding milk and other liquids of like character.

At the present time, milk is generally bottled in glass bottles, which, however, are most objectionable by reason of the fact that their weight renders them cumbersome to handle and to haul to and from the dairy. Such bottles, furthermore, are apt to become inverted, fall upon their sides and even become broken during transit from the dairy, in which instance their contents are usually wholly or partially lost by spilling or leakage. The empty bottles must be collected along a route at the same time that filled bottles are delivered, and must be thoroughly washed and sterilized before being refilled in order to prevent the spreading of zymotic and other diseases, a proceeding which obviously entails an extra expense to the dairy, the collection of the bottles themselves consuming considerable time as well as precluding the delivery wagon from being loaded to its full capacity owing to the room which they take up. On the other hand, the paper bottles forming part of the subject matter of the present case, occupy but little room in the wagon, thereby permitting all available space in the latter to be utilized; their use enables the driver to deliver over a longer route than is ordinarily possible since each bottle is intended to be used once only and no time is lost in collecting the empty bottles; the bottles are highly sanitary, inasmuch as they are constructed of waterproofed material, and are practically non-refillable; and they are economic in that they can be manufactured at a low cost and when once properly sealed, retain their contents until opened without danger of leakage or spilling.

It may be stated accordingly, that the object of the present invention comprises, briefly, the production of a filled and sealed paper bottle of the type specified, by means of improved apparatus which preferably includes *inter alia*, devices for feeding the bottles to the closing and sealing mechanisms, devices for supporting said bottles during their feed, means for positioning the bottle supporting devices or holders with reference to the bottle closing and sealing mechanisms when the same are reached, and instrumentalities for operating the mechanisms, parts and devices above specified. These mechanisms, parts and devices, both singly and in combination with one another constitute the essential features of the invention, as set forth in the appended claims.

Figure 2:
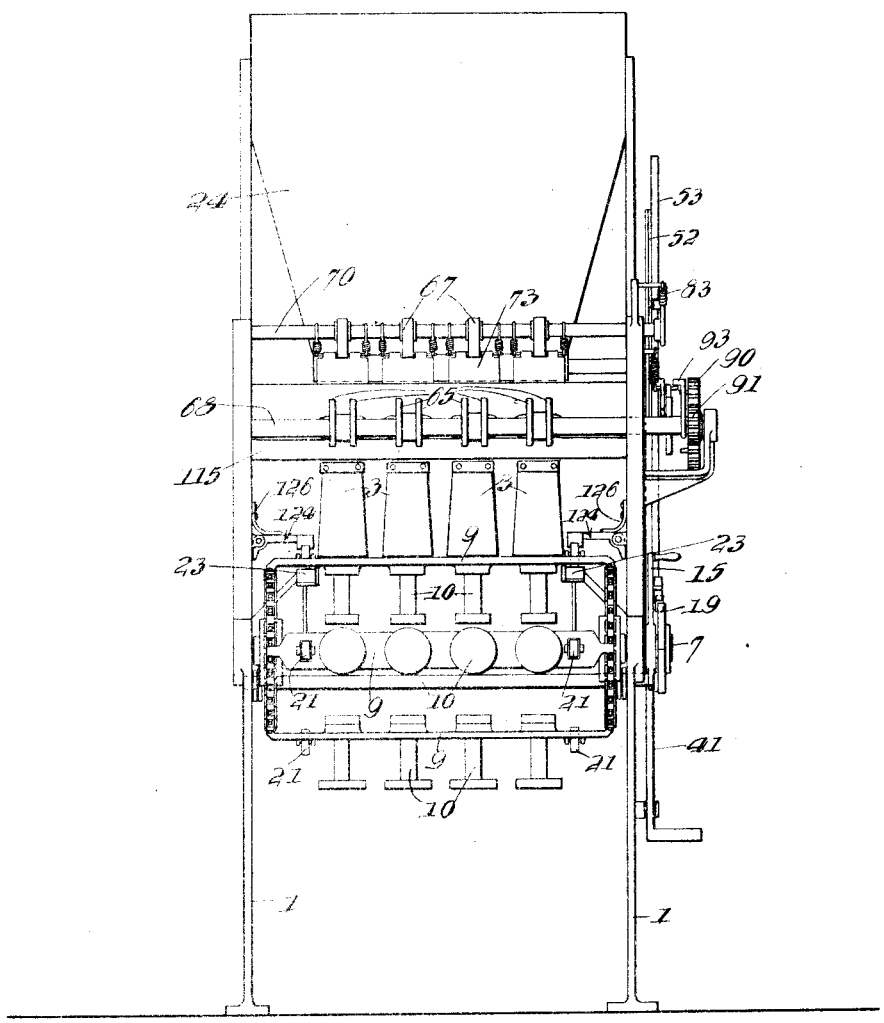
Figure 12:
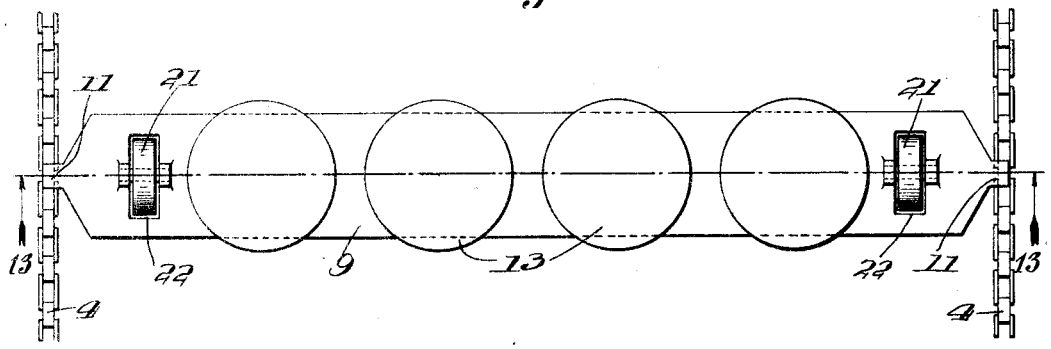
Figure 13:
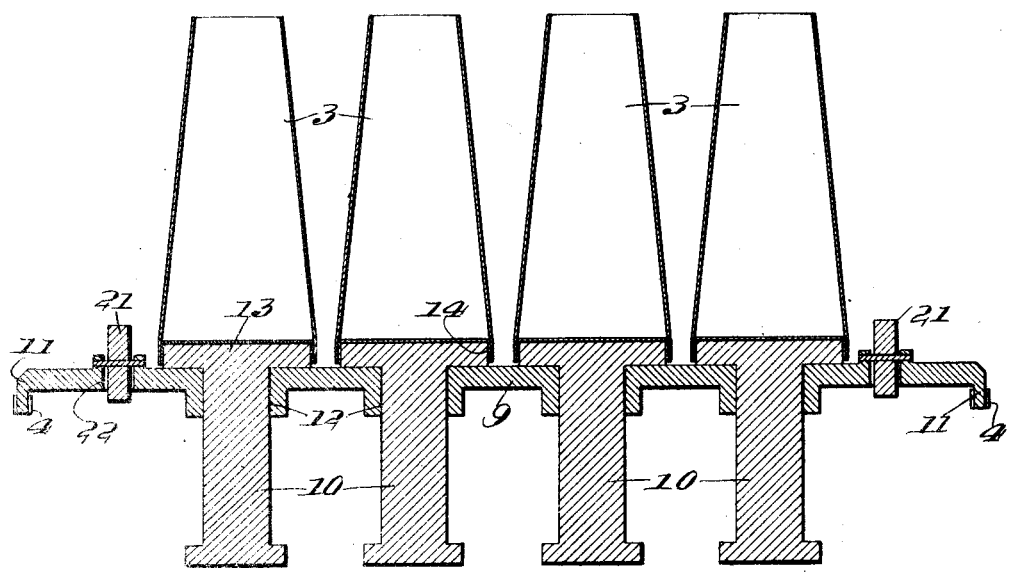
Figure 28:
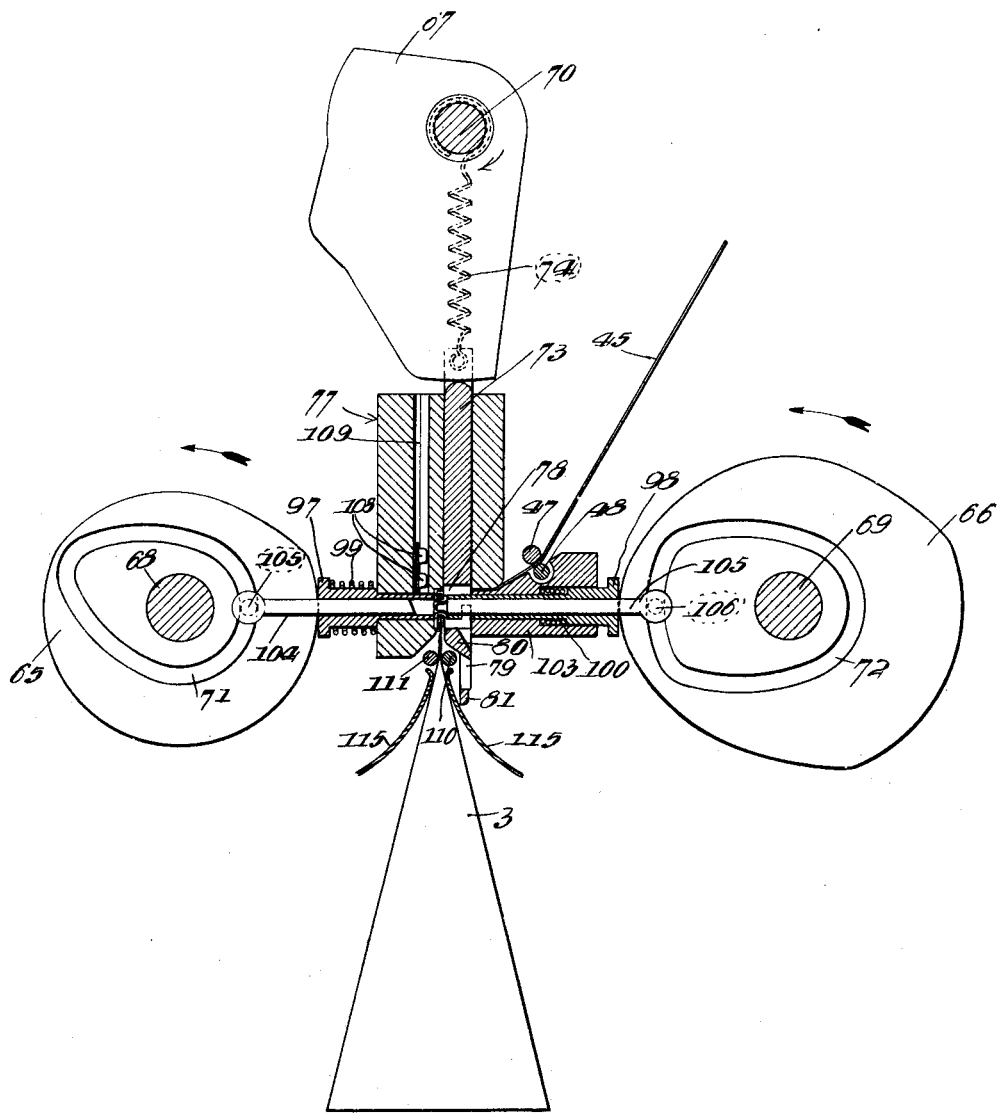
Figure 29:
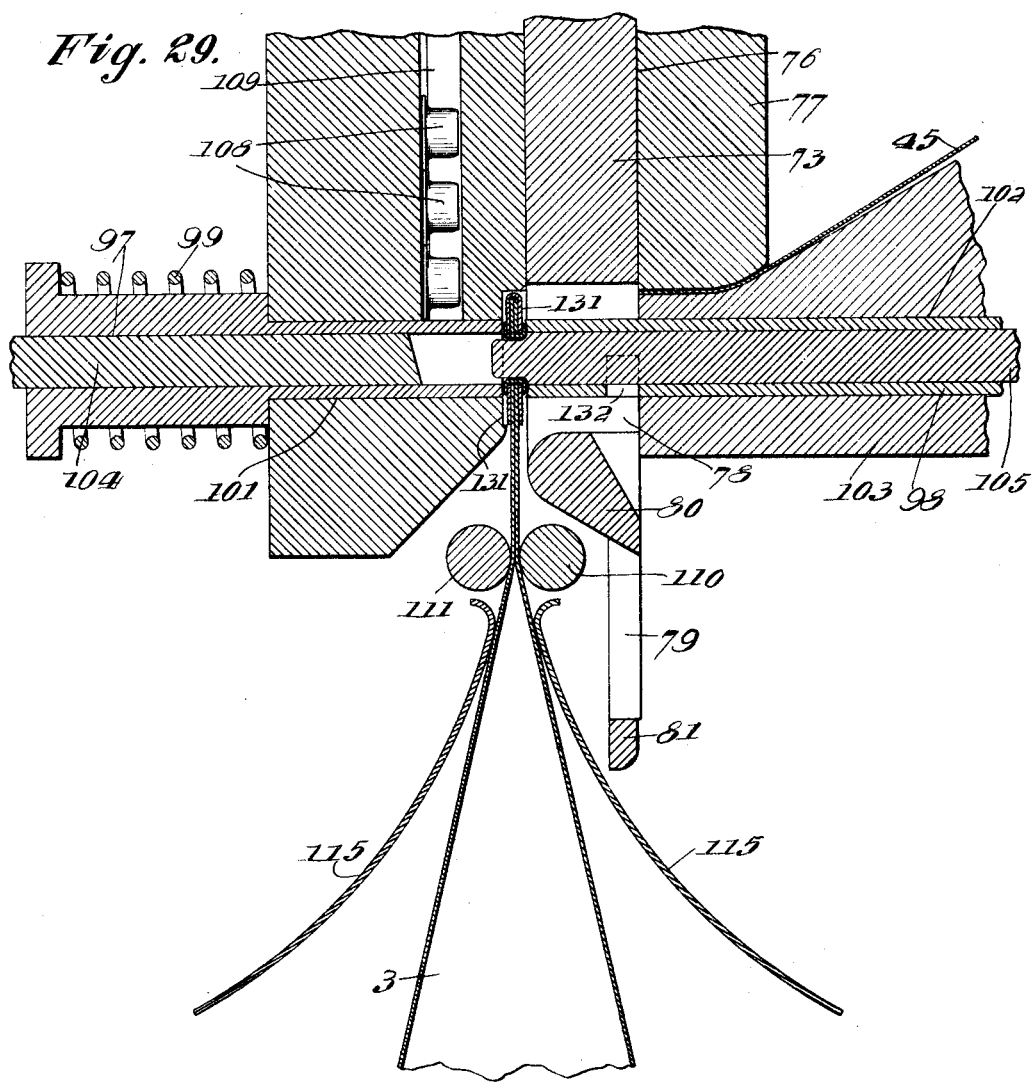

A structural embodiment of the invention is illustrated in the accompanying drawings, whereof:

Figure 1 is a side elevation of the complete apparatus, Fig. 2 is a front elevation, Fig. 3 is an enlarged fragmental plan view of the front portion of the apparatus, Fig. 4 is a transverse vertical section taken on the line 4—4 of Fig. 3, Fig. 5 is an enlarged detail view, in side elevation, of the mechanism for actuating the closing and sealing mechanism, Fig. 6 is a transverse horizontal section taken on the line 6—6 of Fig. 5, Fig. 7 is a transverse vertical section taken on the line 7—7 of Fig. 6, Fig. 8 is an enlarged detail view of one of the shafts employed for feeding the metal sealing strip to the afore-mentioned closing and sealing mechanism, and the parts directly associated with that shaft, Fig. 9 is a face view of the device employed for preventing reverse rotation of said shaft, Fig. 10 is a fragmental detail view of the devices employed for driving the feeding shaft, Fig. 11 is a vertical section taken on the line 11—11 of Fig. 8, Fig. 12 is an enlarged plan view of a series of bottle-holders and the carrier for the same. Fig. 13 is a longitudinal section taken on the line 13—13 of Fig. 12, the bottles appearing in vertical section, Fig. 14 is an enlarged vertical sectional view of the liquid reservoir, and its associated valves, one of the bottles being shown in elevation therebeneath, in position to be filled. Fig. 15 is a detail face view of the device utilized for centering the bottle carriers with reference to bottle-raising mechanism which is employed, Fig. 16 is a side elevation of said centering device, Fig. 17 is a perspective view of one of the metal bending and cutting devices comprehended in the closing and sealing mechanism, Fig. 18 is a perspective view of one of two guides which are likewise included in the aforementioned mechanism, Fig. 19 is a similar view of the other guide, Fig. 20 is a plan view of the combined guide and presser device for acting on the bottles after the same have been raised, Fig. 21 is a side elevation of Fig. 20, Figs. 22 to 28 are detail sectional views taken on the line A—A of Fig. 4, depicting the working parts of the closing and sealing mechanism in the various positions which they successively assume during operation, Fig. 29 is an enlarged fragmental detail of Fig. 28, depicting the final position of said parts before returning to their initial position, Fig. 30 is a perspective view of the bottle in the condition in which it is delivered to the apparatus, Fig. 31 is a longitudinal sectional view of said bottle, Fig. 32 is a perspective view of the bottle after having been completely closed and sealed during its passage through the apparatus.

The apparatus shown in said drawings consists, essentially, of a suitable frame, base, or support 1, whereon the several mechanisms, devices and instrumentalities hereinafter described are mounted, and a conveyer 2 for carrying the bottles 3 through the apparatus. This conveyer, in the present instance, is constituted by a pair of endless chains 4 which connect front and rear pairs of sprockets 5 and 6 secured to shafts 7 and 8 journaled and supported in frame 1. The chains themselves are connected at suitable intervals by transversely arranged bars 9 that act as carriers for the bottle holders 10, depicted in Figs. 12 and 13, the downturned reduced ends 11 of these bars being attached to said chains in any desired manner. Each carrier is adapted to support one or more of the aforesaid holders, which latter are slidably fitted in perforations 12 formed in the carrier. Both ends of the holders are enlarged to limit their sliding movement in opposite directions, the larger upper ends 13 constituting heads upon which the bottles are fitted.

Figure 30:
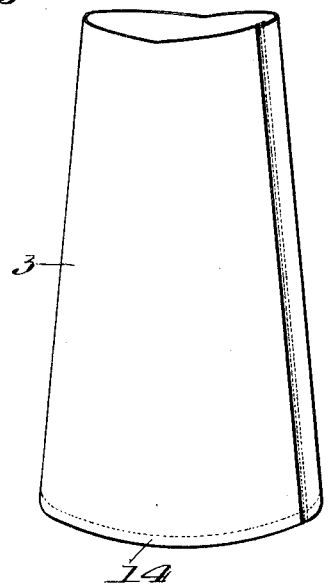
Figure 31:
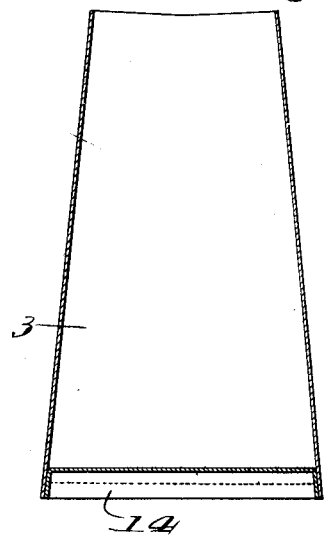
Figure 32:
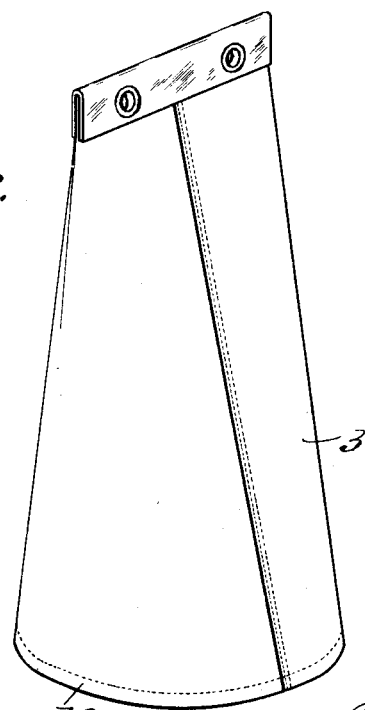

The type of bottle preferably employed is depicted in Figs. 30 and 31, and, as shown therein, has the shape of an axially elongated truncated cone, the base portion of which is formed with a depending peripheral flange 14 that is designed to encircle the head 13 of a holder, when in place thereon. The bottles are constructed of paper or other sheet material of a like character, which is treated with a water-proofing substance, such, for example, as paraffin. They may be made to contain any desired quantity of milk or other liquid, as will be understood, and may be fitted upon their holders either by hand or by means of suitable mechanism.

To drive the conveyer 2, the following parts are preferably provided: Upon one end of the front shaft 7 there is loosely mounted a handle 15 which is normally held by a spring 16 in contact with a stop pin 17 secured to the frame-work of the apparatus. This handle carries a spring pressed pawl 18 that engages the peripheral edge of a three-toothed ratchet 19 rigidly mounted on shaft 17. When the handle is swung forwardly, its pawl will be brought into engagement with the adjacent ratchet tooth, whereupon continued movement of said handle will effect rotation of said shaft and, in consequence, of the conveyer, such rotation continuing until a projection 20 provided upon the handle strikes against pin 17. The handle is then released, and returns automatically to its initial position under the influence of spring 16, the conveyer remaining at rest at that time. Pin 17 serves, therefore, to limit both the forward and backward movement of the handle.

To support the upper stretch of the conveyer when in operation, the several carriers 9 are each preferably provided at opposite ends with rollers 21 which are mounted thereon in any desired manner and project through openings 22 in said carriers, the lower portions of these rollers resting on suitable tracks 23 connected with the frame work of the apparatus.

During their travel with the conveyer toward the front of the apparatus, the empty bottles are first brought into position in alinement with the filling mechanism, the driving mechanism for said conveyer hereinabove described being so constructed and arranged that at each actuation of handle 15 a row of bottles is brought into position to be filled, while a second row of bottles, which have previously been filled are moved into position to be closed and sealed, and a third row is moved from beneath the closing and sealing mechanism into position for removal from the conveyer. The aforementioned filling mechanism, as shown in Figs. 1 and 14, preferably comprises a reservoir 24 adapted to contain a supply of milk or other liquid, the bottom of which reservoir is formed with a series of outlet passages 25 equal in number to the number of bottles comprised in one of the rows. To said bottom is detachably connected a series of measures 26, each made to hold a pint, quart or other desired quantity corresponding to the capacity of the bottles to be filled. These measures are also provided with outlet passages 27. The flow of milk through the passages 25 and 27 is controlled through the agency of separate valve systems constituted, in the present instance, by upper and lower shafts 28 and 29 that are suitably journaled and supported in the bottom portions of said reservoir and measures and are formed, respectively, with series of openings 30 and 31 corresponding in number to said passages and adapted to be brought into and out of registration with the latter, during the rotation of the shafts, as will be understood. To actuate said shafts, they are provided at one end with crank arms 32 and 33 whose reduced terminals are engaged in slots 34 and 35 formed intermediate the ends of a pair of horizontally-disposed operating bars 36 and 37 slidably supported in brackets connected with the frame-work. These slides are normally forced toward the front of the apparatus by a pair of springs 38 and 39, and their forward ends are adapted to be engaged by the inclined surface 40 of the main operating bar 41, which latter is vertically disposed with respect to the apparatus, is slidably supported and guided in the frame-work thereof (preferably by the engagement of a pin or pins 42 in a longitudinal slot or slots 43 in said bar, as depicted in Fig. 1), and is normally held in elevated position by a spring 44. It will be apparent, therefore, that when the operating bar is depressed, (either manually or through the intermediary of suitable mechanical devices), its inclined surface 40 will first engage the upper slide 36 and force the latter rearwardly, so as to rock shaft 28 in a counter-clockwise direction, and, as the downward movement of said bar continues, its said surface will engage and shift the lower slide 37 in a similar manner, thereby rocking shaft 29 in a clockwise direction.

In practice, the openings 30 and 31 are preferably disposed at right angles to each other, as depicted in Fig. 14, the upper openings normally alining with passages 25, while the lower openings are normally out of alinement with the passages 27. Consequently, the measures are normally in communication with the reservoir and, hence, remain filled, the above-described movements of the respective slides serving to close such communication and move openings 31 into alinement with passages 27, whereupon the milk will flow from the measures into the bottles therebeneath. When the upward movement of the operating bar takes place, consequent upon its release, and the cam surface 40 thereon passes beyond bar 37, the latter will be free to move forward under the influence of spring 39, thereby rocking shaft 29 counter-clockwise and closing the valves in the measures, and, similarly, when said surface passes beyond bar 36, that bar will also advance through the agency of its spring 38, and will rock shaft 28 clockwise, so as to open the reservoir valves and permit re-filling of the measures. After having thus been filled, the bottles are carried by the conveyer into position to be acted upon by the closing and sealing mechanism, which mechanism serves to flatten and close together the mouths of the bottles, bend a strip of thin metal, (preferably sheet tin) over the closed mouths, and fasten said strips securely to said mouths. This mechanism may advantageously be actuated by means of the operating bar 41, so that such actuation will take place simultaneously with that of the filling mechanism.

The tin, indicated by the numeral 45 is wound in the form of continuous strips upon suitably-supported reels 46 and is fed toward the main working parts, hereinafter referred to and described, of the aforesaid closing and sealing mechanism by means of a pair of horizontal shafts 47 and 48, the former of which has two separate rotary movements imparted thereto during each descent of the operating bars 41. This shaft carries on the end which is adjacent bar 41 a loose gear 49 which is successively engaged by upper and lower series of teeth 50 and 51 formed in spaced relation on one edge of a vertical rack 52 that is connected to said bar, preferably to a depending hook-shaped nose 53 provided upon the upper end of the bar. To one face of gear 49 there is rigidly secured a disk 54 carrying a spring-pressed pawl 55 that coacts with the single tooth 56 of a ratchet 57 fast on shaft 47, as depicted in Figs. 8, 10 and 11, the opposite end of shaft 47 carrying a ratchet 58 of the ordinary type that is secured thereon and is engaged by a gravity pawl 59, (see Figs. 8 and 9). When the downward movement of rack 52 takes place, consequent upon the descent of the operating bar, its lower teeth 51 will engage the adjacent series of teeth 61 on gear 49 and will turn the latter through one-half revolution, the aforesaid teeth 61 being separated from the other series of teeth 62 on said gear by blank or untoothed spaces 63 and 64, as shown in Fig. 10. During this rotation of gear 49, the pawl 55 carried by its disk 54 is engaged with the tooth 56 on ratchet 57, as a result of which shaft 47 will also be moved through a half-revolution, thereby producing an initial form and feed movement of the tin into the position depicted in Fig. 22. At the termination of the period of rotation referred to, the rack teeth 51 pass below the gear teeth 61, and the left-hand untoothed or blank portion 63 of said gear is brought opposite the rack edge, so that the continued downward movement of the rack produces no further rotation of the tin-feed shaft 47 until the upper series of rack teeth 50 are brought into play, as hereinafter described. Rack 52 is shown in its initial position in Fig. 10, as will be understood.

The several treatments to which the tin is subjected inclusive of its feeding, are preferably effected through the agency of series of cams 65, 66 and 67 secured, respectively, to horizontal shafts 68, 69 and 70 the cams 65 and 66 being provided upon one face with cam grooves 71 and 72. The cams 65 and 66 are arranged in pairs upon their respective shafts, for reasons subsequently set forth, and the number of such pairs is equal to that of the cams 67.

The bending and cutting of each strip of tin is effected by means of a plate-like member 73 depicted in Fig. 17. These members are suspended by pairs of retractile coil springs 74 from shaft 70 and are depressed by the cams 67 thereon against the action of said springs, the peripheries of the cam being received in recesses 75 formed in the upper edges of said members. They are adapted to reciprocate in vertical passages 76 provided in a guide 77 (see Fig. 18), there being a separate passage for each of said members. The members in question are each provided with a pair of transverse apertures 78, and below the same with a transverse slot 79, the upper longitudinal wall of each slot being sharpened and rearwardly curved or beveled to produce the cutter 80. The extreme lower portion 81 of each member is reduced in thickness.

Shaft 70 is adapted to be rocked through the instrumentality, preferably, of a lever 82, best shown in Fig. 5, which is secured thereto at one end and is controlled by a spring 83. The opposite end of this lever lies in the path of nose 53 of the operating bar 41, and when the latter is depressed, said nose will engage said lever end and turn or swing the lever into the position indicated in dotted lines in the figure referred to, thereby rocking shaft 70 in a clockwise direction, with resultant actuation of the cams. The aforesaid nose 53 is, also, designed to engage the upper end of an arm 84 loosely mounted intermediate its ends on a horizontal shaft 85 supported by brackets 85ª and arranged between and parallel with the shafts 68 and 69, so as to turn or swing said arm in a clockwise direction. This arm is provided adjacent its upper end with a pin 86 on which is pivoted a spring-pressed pawl 87 that engages the teeth 88 of a ratchet 89, which is rigidly secured to one face of a gear 90, also, loosely mounted on shaft 85, said gear meshing with the gears 91 and 92 fast on the cam shafts 68 and 69 (see Figs. 5 and 7). The gears 90, 91, and 92 are so proportioned that the last two gears each make a complete revolution during one-third of a revolution of the first gear, the teeth 88 on ratchet 89 being three in number, as shown. To prevent over-running of gear 90 at each partial rotation thereof, a plate 93 or other suitable device may be employed, said plate being shown in the present instance, as loosely pivoted at one end to shaft 69 and as formed at its opposite end with an offset hook 94, which normally rests upon pin 86, at which time it is supported above the path of movement of a series of three lateral pins 95 secured to said gear. When the gear mentioned is partially rotated consequent upon the swinging of arm 84, due to the depression of the operating bar 41, as above described, the hook 94 will be disengaged from its supporting pin 86 and will be free to drop into position for engagement by the approaching gear pin 95, thus terminating the rotation of said gear. Arm 84 is returned to its initial position after each actuation through the action of a suitable spring 96, being limited in such movement by the engagement of its finger 84ª with shaft 68.

The punching operation, a portion of the bending operation, and the feed, insertion and securing of the fastening devices are effected through the agency of the cams 65 and 66 and their grooves 71 and 72. The peripheral edges of said cams operatively engage the enlarged outer portions of hollow plungers 97 and 98, which are, respectively, controlled by springs 99 and 100, best shown in Fig. 29. These plungers are likewise arranged in pairs and their reduced inner portions reciprocate in horizontal passages 101 and 102 that are formed through the guide 77 and through a second guide 103, a portion of the latter guide being arranged directly below the first-mentioned guide. The inner ends of said plungers are arranged in alinement with each other. Each plunger of one series has movable within its interior a punch rod 104, and each plunger of the other series is provided with a similarly-arranged die rod 105, the aforesaid puncher being operatively connected with the respective cam grooves 71, and the die rods with the cam grooves 72, by means of pins 106 and 107 with which their outer ends are provided. The fastening devices 108 employed are preferably in the form of eyelets or rivets which are loaded in vertical, open-ended magazines or chutes 109 in the main guide 77, these chutes being arranged in pairs, as will be surmised, so as to have a pair of rivets to be attached to each bottle mouth. The lower ends of the chutes open into the passages 101, but are normally closed by the ends of the plungers 97.

In connection with the parts above described, there are provided devices or instrumentalities for closing the mouths of the bottles, when the latter are brought to a position beneath the closing and sealing mechanisms and prior to the application of the sealing strip, for raising the bottles into position to permit them to be operated upon by the said mechanism and the closing device, and for centering the bottles with reference to the elevating device. The first of these devices, which is illustrated in Figs. 20 and 21, consists preferably of fixed and movable horizontal rollers 110 and 111 supported in parallel relation in the framework 1, the movable roller having its ends disposed in slots 113 therein and being normally faced toward the fixed roller by springs 114. The bottles, on being raised by the hereinafter described elevating device, are directed toward said rollers by means of a pair of opposed guides 115 located directly beneath the rollers.

The above mentioned elevating device consists, in the present instance, of a transversely-arranged horizontal plate 116 which is supported at its ends by a pair of links 117 pivoted to arms 118 carried by a transversely-arranged horizontal rock shaft 119, journaled in the frame-work (see Figs. 1 and 4). To operate this shaft same is provided with a third arm 120 which projects in the opposite direction from arms 118 and is secured on the projecting end of said shaft adjacent to the operating bar 41, so as to extend into the path of the lower shoulder 121 formed on said bar. The arrangement is such, therefore, that depression of the bar will serve to rock said shaft, and, in consequence to elevate plate 116 into contact with the lower ends of the stems of a row of holders, thereby raising the latter and causing them to move the mouths of the bottles thereon between the guides and the closing rollers 110 and 111. The bottles and their holders will be held in elevated position by the engagement of arm 120 with the adjacent face of the operating bar until shoulder 121 has passed beyond said arm 120 during the ascent of the operating bar. Plate 116 is guided during its movements by means of a pair of depending rods 122 secured to tracks 23, these rods projecting through openings 123 in said plate. (See Fig. 4).

The devices for centering the holder carriers in position to permit the elevation of the holders by plate 116 may each advantageously comprise a bell-crank lever 124 pivoted to a lug carried by the frame directly above the ends of said parts, the shorter vertical arm 125 thereof being held against the adjacent frame wall by means of a spring 126 which bears upon the long horizontal arm 127, as depicted in Fig. 16, so as to normally hold the lever in operative position. At its outer end, each lever arm 127 carries a plate 128 formed with an inverted V-shaped notch 129 which extends upwardly from the central portion of its lower edge, said notch being adapted to receive therein the roller 21 on the adjacent end of the carrier. The lower edges of the end portions of plate 128 are inclined or curved downwardly toward the notch as indicated by the numeral 130, so as to raise the plate during the travel of the carrier, the peripheries of the rollers 21 engaging the lower edges of the plates, as shown in Fig. 16.

Figure 22:
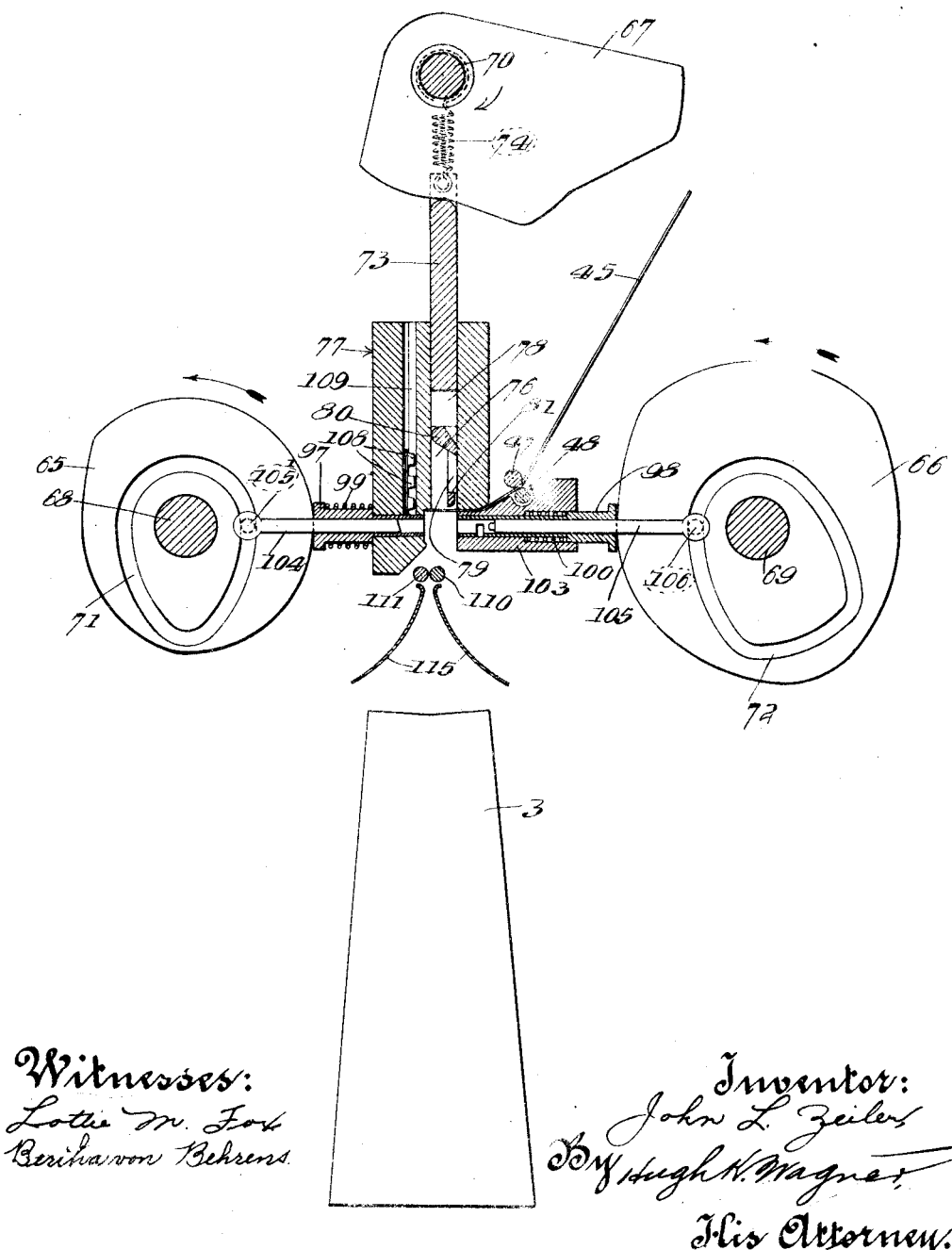
Figure 23:
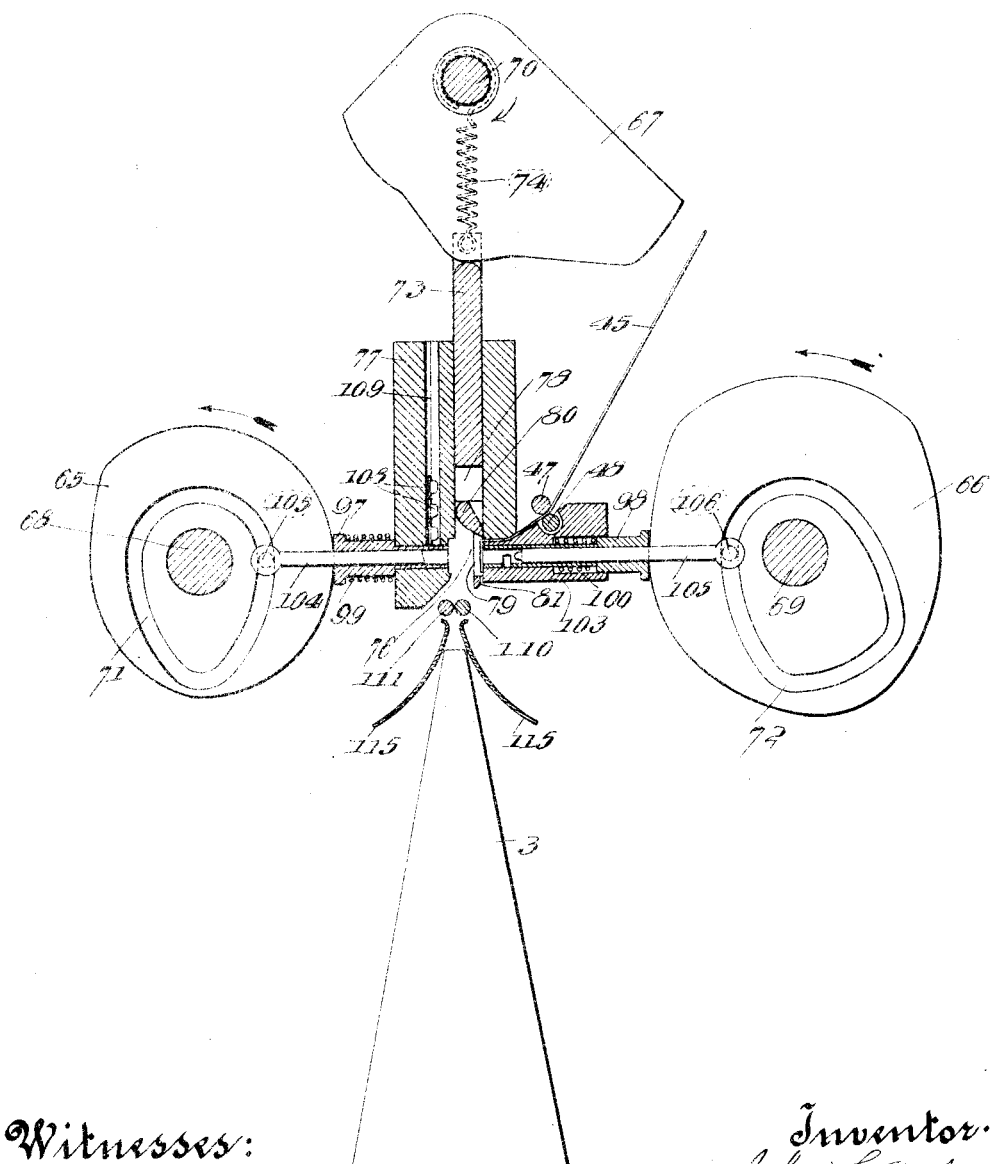
Figure 24:
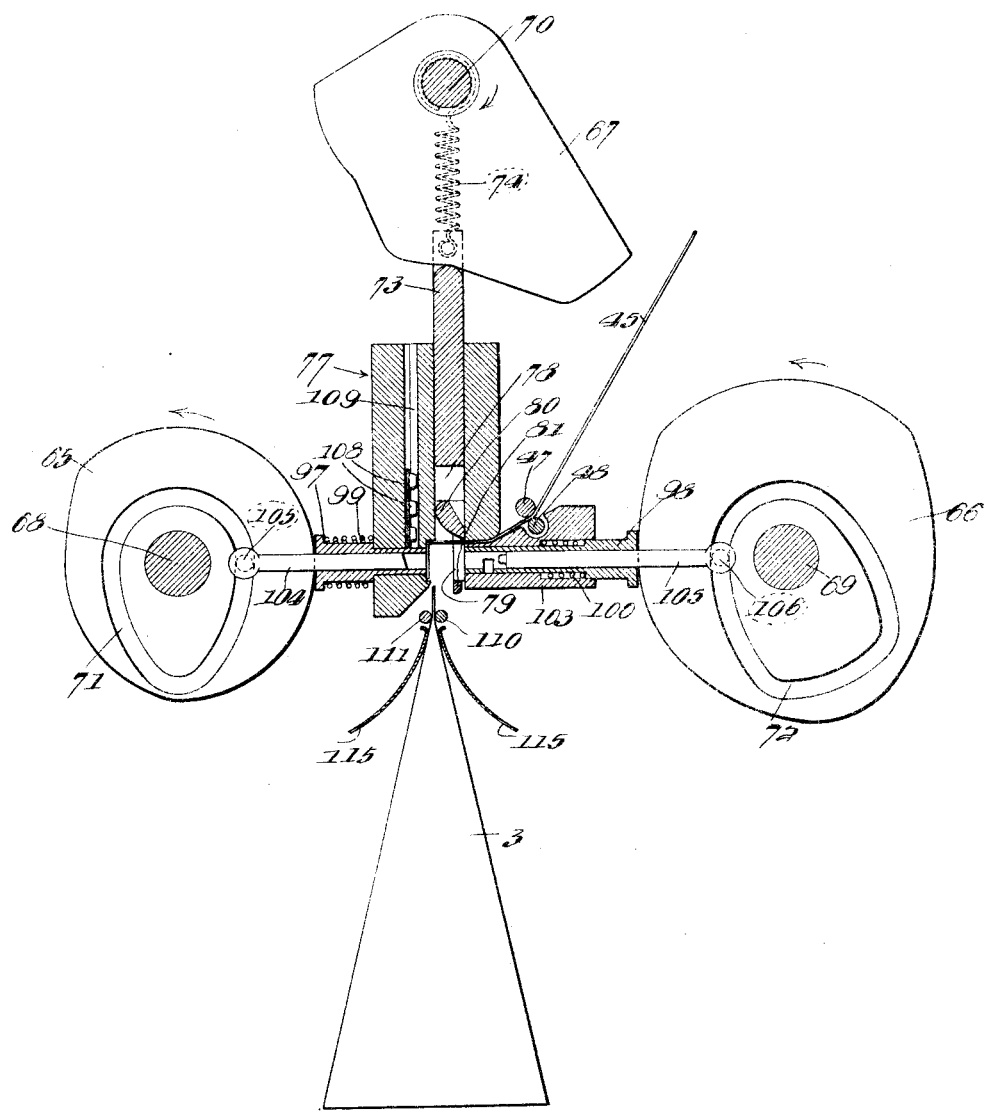
Figure 25:
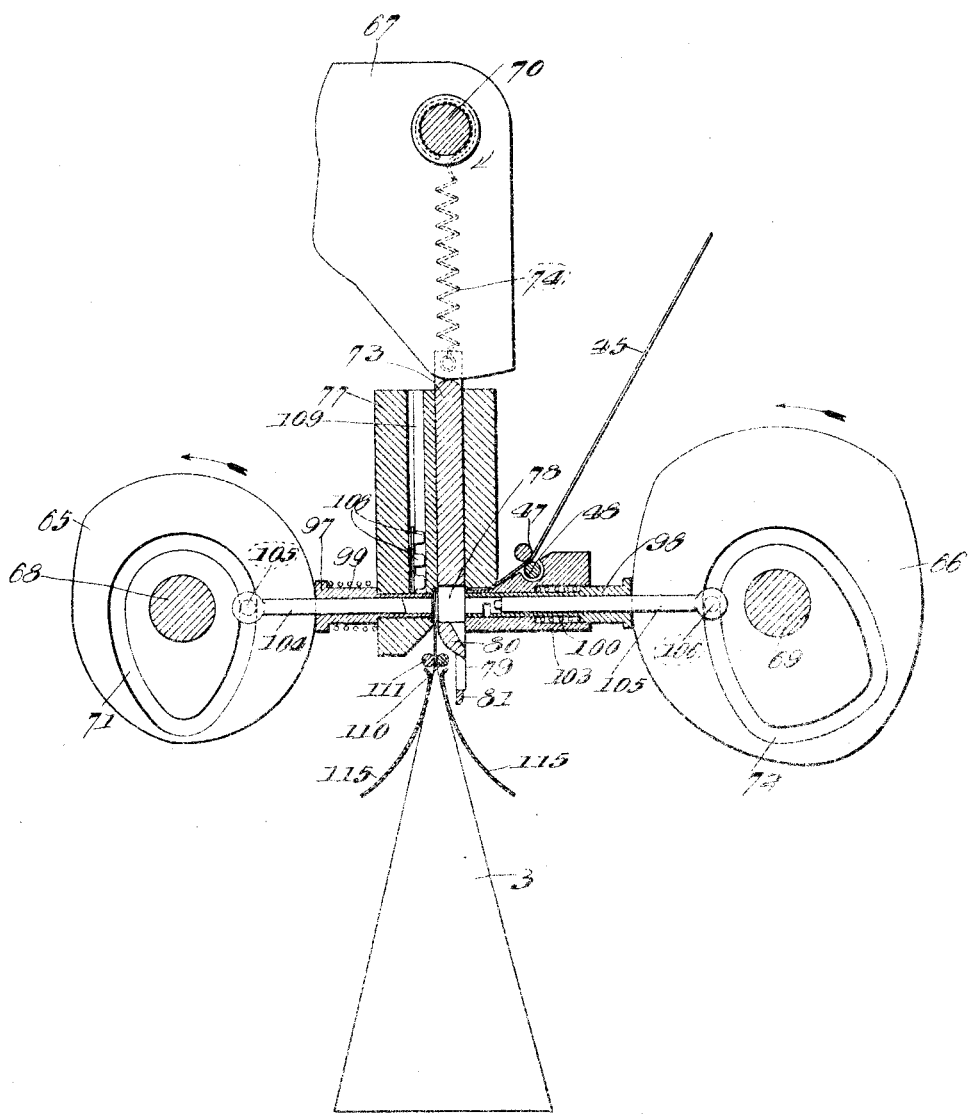
Figure 26:
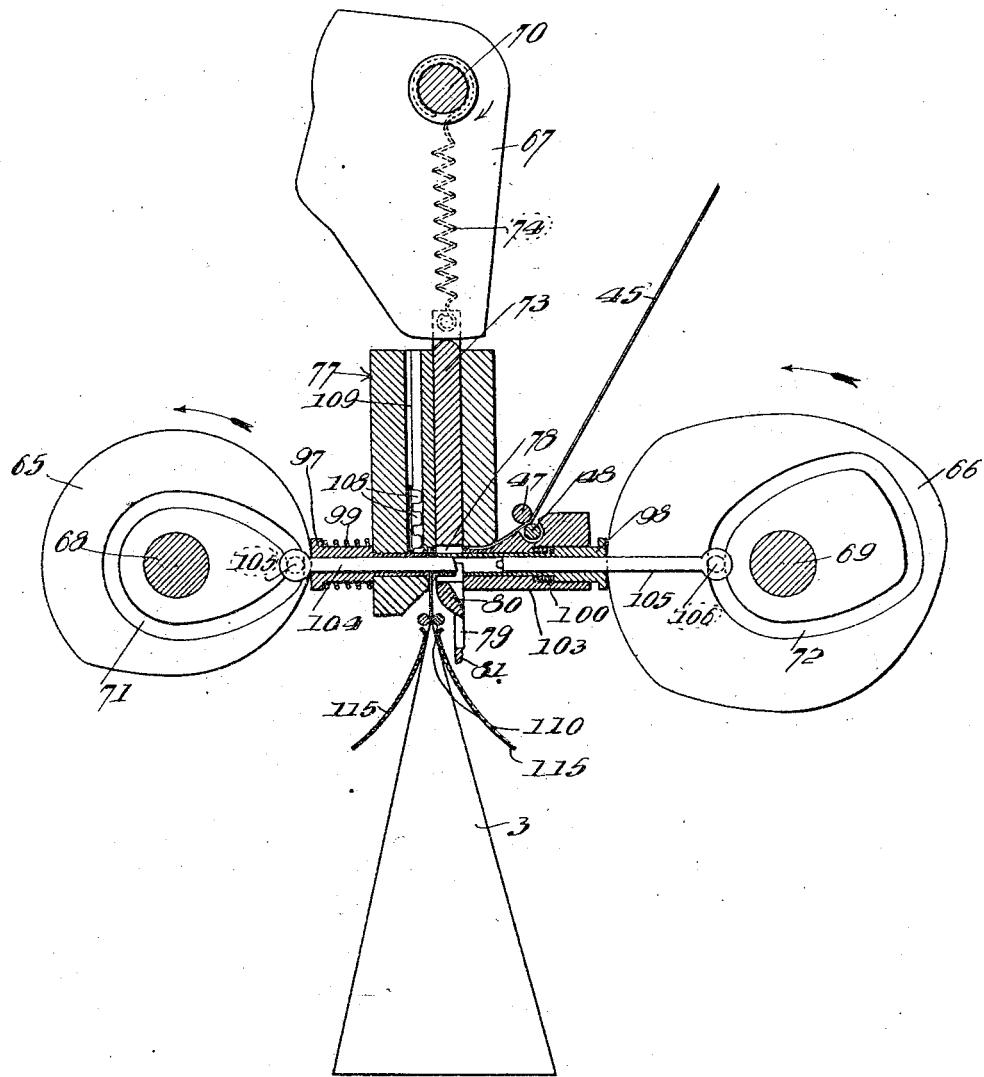
Figure 27:
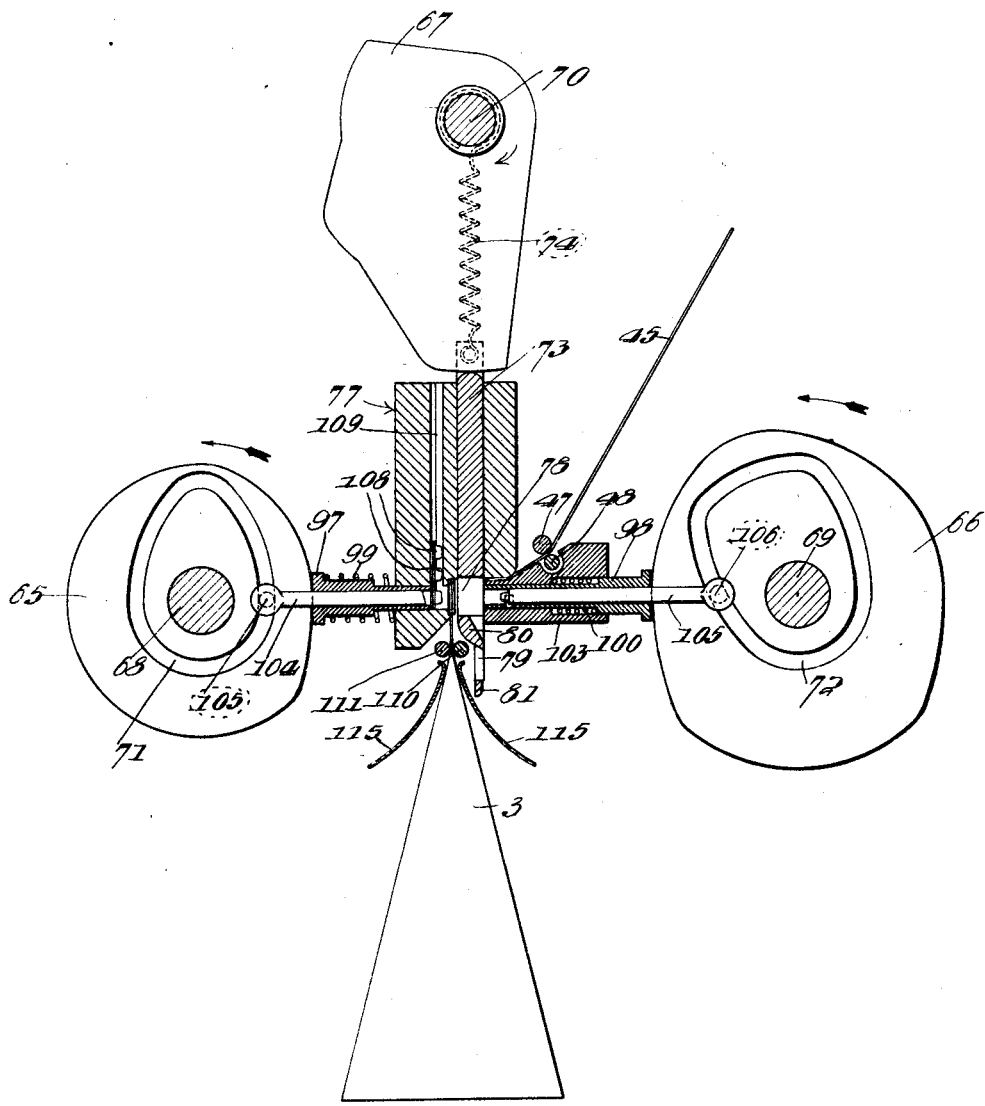

The operation of the main working parts of the closing and sealing mechanism proper is substantially as follows, and will best be understood from an inspection of Figs. 22 to 28 inclusive. Referring back to the description of the rack bar 52, and the parts directly associated therewith, it will be remembered that the downward movement of this bar initially rotates the tin feed shaft 47 through a half revolution, with a resultant feed of the strips of tin through the space between the guides 77 and 103 into and across the passages 76 in the former guide and below the lower edges of the reduced portions 81 of the combined bending and cutting members 73, which latter are then (initially) in their highest position, as shown in Fig. 22. In describing the further positions successively occupied by the several sets of these parts, reference will be had to one set only, as all of the sets operate in identically the same manner. As the downward movement of the rack bar is continued, the active tin feed shaft is idle, but the shaft 70 carrying the cams 67 for operating the aforesaid members 73 is rocked through the instrumentality of lever 82 and nose 53. Member 73 moves downward in its passage into the position shown in Fig. 23, its reduced portion 81 bending the projecting end of the tin backwardly and downwardly against the open inner ends of the corresponding pair of passages 102. At about the time that this bending step has been completed, the upper rack teeth 50 engage the teeth 62 in the feed gear, and effect a second feed movement of the strip, the previously bent end of which moves across passage 76 through the slot 79 in member 73, which is then at rest, and seats itself in a recess 131, in the far wall of said passage (see Figs. 24 and 29). During this period, the bottles are raised by the elevating devices into the position shown in Fig. 24, their mouths being flattened and forced or squeezed shut by the action of the rollers 110 and 111 which constitute the closing device. Further rotation of shaft 70 continues the downward movement of member 73, with the result that that portion of the tin strip which projects across passage 76 is severed by blade 80, and is forced by the same against the adjacent face of the flattened bottle mouth, thereby closing it. This position of the parts is depicted in Fig. 25. At this time, nose 53 will have passed beyond the end of lever 82, and said lever will be engaged by the side edge of the nose, the member 73 thus being held in the position shown in the figure last referred to, with its perforations 78 registering with the passages 101 in guide 77. Lever 82 is depicted in dotted lines in this position in Fig. 5. Nose 53 then moves into contact with the upper end of lever 83, and rocks the latter, whereupon the gears 90, 91 and 92 will be caused to rotate, effecting, in consequence, simultaneous rotation of the cam shafts 68 and 69. During the revolution of said shafts, the cams 65 and 66 thereon will turn into the positions depicted in Fig. 26, and as this takes place plunger 98 will be forced inwardly so as to engage the adjacent folded portion or leaf of the tin sealing strip and to act as a brace for the same during the inward or operative movement of the punch 104 effected by the cam groove 71. The pieces of tin and paper cut from the mouth of the bottle by the action of the punch fall out through an opening 132 formed in the hollow plunger 98 and thence through the space behind blade 80 out of the apparatus. As the above-mentioned cams move through their succeeding partial revolution, they gradually assume the position shown in Fig. 27, both plungers 97 and 98 moving backward under the influence of their controlling springs. This movement of the plunger 97 opens communication between the rivet chute 109 and the corresponding passage 101, thus permitting a rivet to drop into the latter from the former. During the continued movement of the cams, both the plunger 97 and the die 105 are moved inwardly into the positions shown in Figs. 28 and 29, at which time said plunger forces the rivet into the previously cut opening therefor, while the die serves to spread the rivet sufficiently to cause it to project into the path of movement of the plunger 98, which latter also, is moved inwardly at the same time. Further rotation of the cams will restore the plungers, punch and die to their respective initial positions. Pressure upon the operating bar is then relieved, whereupon said bar will ascend automatically through the agency of its controlling springs 44, and, in so doing, permits levers 82 and 84 likewise to assume their normal positions. During the return movement of lever 82, shaft 70 will be rocked counter clockwise, and will, in consequence return the actuating cam 67 for the combined bending and cutting member to normal position, thus permitting said member to ascend into normal position. The return movement of lever 84, will, however, have no effect upon gear 90, since its pawl 87 will ride idly along the periphery of ratchet 89.

The operation of the entire apparatus is believed to be apparent from the foregoing and to require no further description.

What is claimed is:

1. In an apparatus for closing and sealing paper bottles, the combination of a feed conveyer for the bottles, separate mechanisms for squeezing together the mouths of the bottles at opposite sides, to close the same, and for sealing the previously closed mouths, and means for raising the bottles on being brought into position, in alinement with the closing mechanism to be operated upon thereby.

2. In an apparatus for closing and sealing paper bottles, the combination of a feed conveyer for the bottles, separate mechanisms for squeezing together the mouths of the bottles at opposite sides, to close the same, and for sealing the previously closed mouths, means for raising the bottles on being brought into position in alinement with the closing mechanism to be operated upon thereby, and means for centering the bottles with relation to said raising means.

3. In an apparatus for closing and sealing paper bottles, the combination of a pair of coacting rollers, means for forcing the mouths of the bottles between said rollers to squeeze together the sides of said mouths, to close the same, and means for sealing the closed mouths of the bottles.

4. In an apparatus for closing and sealing paper bottles, the combination of a pair of coacting squeezing rollers, means for raising the bottles bodily toward said rollers to introduce the mouths of the bottles therebetween, to cause the opposite sides of said mouths to be squeezed together and closed by said rollers and means for sealing the closed mouths of the bottles.

5. In an apparatus for closing and sealing paper bottles, the combination of a pair of coacting rollers, means for forcing the mouths of the bottles between said rollers to cause the opposite sides of said mouths to be squeezed together and closed thereby, means for centering the bottles with relation to said rollers, and means for sealing the closed mouths of the bottles.

6. In an apparatus for closing and sealing paper bottles, the combination of a pair of coacting elements, means for moving the bottles bodily endwise toward said elements to force their mouths between said elements and cause the latter to close said mouths, means for sealing the closed mouths of the bottles, and a common manually actuated element for operating said forcing means and said sealing means.

7. In an apparatus for closing and sealing paper bottles, the combination of a pair of coacting elements adapted to squeeze the opposite sides of the mouths of the bottles together, to close the same, means for forcing said mouths between said elements, means for sealing the closed mouths of the bottles, a depressible operating bar, and separate connections between said bar and said forcing means and said sealing means.

8. In an apparatus for closing and sealing paper bottles, the combination of a bottle holder, a pair of coacting squeezing elements beneath which the holder is arranged to pass, means for raising said holder on reaching a position directly below said elements to introduce the mouth of the bottle between said elements for closing the bottle mouth by the squeezing action exerted thereon consequent upon such introduction, and means for sealing the closed bottle mouth.

9. In an apparatus for closing and sealing paper bottles, the combination of a bottle holder, a pair of coacting squeezing elements beneath which the holder is arranged to pass, means for raising said holder on reaching a position directly below said elements to introduce the mouth of the bottle between said elements for closing the bottle mouth by the squeezing action exerted thereon consequent upon such introduction, means for sealing the closed bottle mouth, and a single element for operating said raising means and said sealing means.

10. In an apparatus for closing and sealing paper bottles, the combination of a carrier, a row of movable bottle holders carried thereby, a pair of spaced coacting elements beneath which said carrier is arranged to pass, a vertically movable member arranged below and in line with said elements, means for raising said member when said carrier reaches a position directly below said elements and above said member for causing the latter to engage and raise said holders, to force the mouths of said bottles into the space between said elements and cause the latter to squeeze together the sides of said mouths to close the same, and means for sealing the closed mouths of the bottles.

11. In an apparatus for closing and sealing paper bottles, the combination of a bottle holder, a pair of coacting squeezing elements beneath which the holder is arranged to pass, means for raising said holder on reaching a position in alinement with said elements, to introduce the mouth of the bottle between said elements for closing the bottle mouth by the squeezing action exerted thereon consequent upon such introduction, means for sealing the closed bottle mouth, and a common operating element for said raising means and said sealing means.

12. In an apparatus for closing and sealing paper bottles, mechanism for closing the mouth of a bottle in combination with mechanism for sealing said closed mouth, said sealing mechanism comprising means for feeding a metal sealing strip toward the bottle, means for bending said strip around said mouth, means for severing the bent portion of said strip from the remaining portion, and means for fastening said bent portion to said bottle mouth.

13. In an apparatus for closing and sealing paper bottles, mechanism for closing the mouth of a bottle in combination with mechanism for sealing said closed mouth, said sealing mechanism comprising means for feeding a metal sealing strip toward the bottle, means for bending said strip around said mouth, means for severing the bent portion of said strip from the remaining portion, means for fastening said bent portion to said bottle mouth, and a common operating element for said closing mechanism and said sealing mechanism.

14. The combination with mechanism for closing the mouth of a paper bottle, of mechanism for sealing said mouth comprising means for feeding a continuous metal strip toward said mouth, means for bending the free end of said strip around said mouth, means for severing said strip end from the remaining portion of the strip, means for forming perforations through the bent portion of said strip and through the closed mouth of the bottle, means for feeding rivets toward said perforations and for forcing the same thereinto, and means for clenching said rivets in said perforations.

15. The combination with mechanism for closing the mouth of a paper bottle, of mechanism for sealing said closed mouth comprising means for feeding a continuous metal strip toward said mouth, means for bending the free end of said strip around said mouth, means for severing the bent end of said strip from the remaining portion thereof, and riveting mechanism for attaching said bent end to said mouth.

16. The combination with mechanism for closing the mouth of a paper bottle, of mechanism for sealing said closed mouth comprising means for feeding a continuous strip of metal toward said bottle mouth, means for bending the free end of said strip around said mouth, means for severing the bent end of said strip from the remaining portion thereof, means for riveting said bent end to said mouth, and a common operating member for said closing mechanism and said sealing mechanism.

17. The combination with mechanism for closing the mouth of a paper bottle, of means for feeding a continuous strip of metal toward said bottle mouth, a single element for bending the free end of said strip around said bottle mouth, and for subsequently severing said bent end from the remaining portion of the strip, means for riveting said bent end to said bottle mouth, and common operating means for said closing mechanism and said feeding means, said bending and severing member and said riveting means.

18. In an apparatus for closing and sealing paper bottles, the combination with a movable carrier and a series of bottle holders carried thereby, of a presser device for squeezing the mouths of the bottles at opposite sides to close the same, means for raising said holders to move the bottles into position for engagement with said presser device, a roller mounted on said carrier, and means adapted for engagement with said roller to center said bottles with relation to said raising means.

19. In an apparatus for closing and sealing paper bottles, the combination of a pair of coacting spaced parallel elements, means for moving a bottle endwise toward said elements, to force its mouth into the space therebetween and cause the opposite sides of said mouth to be squeezed together and closed by said elements, and means interposed between said forcing means and said elements for guiding the mouth of the bottle into said space.

20. In an apparatus for closing and sealing paper bottles, the combination of a pair of coacting spaced parallel elements, means for moving a bottle endwise toward said elements to force its mouth into the space therebetween and cause the opposite sides of said mouth to be squeezed together and closed by said elements, means interposed between said forcing means and said elements for guiding the mouth of the bottle into said space, and means for subsequently sealing said closed mouth.

21. In an apparatus for closing and sealing paper bottles, the combination of a pair of coacting spaced parallel elements, means for forcing the mouth of a bottle into the space between said elements, to cause the opposite sides of said mouth to be squeezed together and closed thereby, and a pair of opposed strips located between said forcing means and said elements for guiding the mouth of the bottle into said space.

22. In an apparatus for closing and sealing paper bottles, the combination of a pair of coacting spaced parallel elements, means for forcing the mouth of a bottle into the space between said elements, to cause the opposite sides of said mouth to be squeezed together and closed thereby, means for centering the bottle relative to said elements and said forcing means, and means interposed between said forcing means and said elements for guiding the mouth of the bottle into said space.

23. In an apparatus for closing and sealing paper bottles, the combination, of a pair of coacting spaced parallel elements, a bottle holder, and means for raising said holder to force the mouth of a bottle carried thereby into the space between said elements and to cause the latter to squeeze together and close the opposite sides of said mouth, said raising means comprising a member arranged to engage the holder, a shaft to which said member is operatively connected, an arm carried by said shaft, and a depressible operating bar provided with a shoulder adapted to engage and actuate said arm during the descent of said bar.

24. In an apparatus for closing and sealing paper bottles, the combination, with a bottle holder, and a pair of coacting spaced parallel squeezing elements, said holder and said squeezing elements constituting companion devices, of means for moving one of said devices bodily in a vertical plane toward the other device, to introduce the mouth of the bottle into the space between said elements and cause said mouth to be squeezed and closed thereby, and means for subsequently sealing said closed mouth.

25. In an apparatus for closing and sealing paper bottles, the combination, with a bottle holder, and a pair of coacting spaced parallel squeezing elements, said holder and said squeezing elements constituting companion devices, of means for moving one of said devices bodily in a vertical plane toward the other device, to introduce the mouth of the bottle into the space between said elements and cause said mouth to be squeezed and closed thereby, and a guide interposed between said devices and beneath said space, for directing the bottle mouth thereinto.

26. In an apparatus for closing and sealing paper bottles, the combination, of a pair of coacting spaced parallel rollers, a bottle holder, and means for raising said holder, to move the bottle carried thereby endwise toward said rollers and force its mouth into the space therebetween, to cause said rollers to squeeze together and close the opposite sides of said mouth, said raising means comprising a member arranged to engage the holder, a shaft to which said member is operatively connected, an arm carried by said shaft, and a depressible operating bar provided with a shoulder adapted to engage and actuate said arm during the descent of said bar.

27. In an apparatus for closing and sealing paper bottles, the combination, of a pair of coacting spaced parallel elements, means for forcing the mouth of a bottle into the space between said elements, to cause the opposite sides of said mouth to be squeezed together and closed thereby, said elements being stationary relative to said forcing means, and means for sealing said closed mouth.

28. In an apparatus for closing and sealing paper bottles, the combination, of a pair of coacting spaced parallel elements, a bottle holder, means for raising said holder to force the mouth of a bottle carried thereby into the space between said elements and cause the latter to squeeze together and close the opposite-sides of said mouth, and means interposed between the raising means and the said elements for guiding the bottle mouth, said raising means comprising a member arranged to engage the holder, a shaft to which said member is operatively connected, an arm carried by said shaft, and a depressible operating bar provided with a shoulder adapted to engage and actuate said arm during the descent of said bar.

29. In an apparatus for closing and sealing paper bottles, the combination, of a pair of coacting spaced parallel rollers, means for forcing the mouth of a bottle into the space between said rollers, to cause the opposite sides of said mouth to be squeezed together and closed thereby, said rollers being stationary relative to said forcing means, and means for sealing said closed mouth.

30. In an apparatus for closing and sealing paper bottles, the combination, of a pair of coacting spaced parallel rollers, means for forcing the mouth of a bottle into the space between said rollers, to cause the opposite sides of said mouth to be squeezed together and closed thereby, said rollers being stationary relative to said forcing means, and means located between said forcing means and said rollers for guiding said mouth directly into said space.

31. In an apparatus for closing and sealing paper bottles, the combination, of a pair of coacting spaced parallel rollers, means for forcing the mouth of a bottle into the space between said rollers, to cause the opposite sides of said mouth to be squeezed together and closed thereby, said rollers being stationary relative to said forcing means, means located between said forcing means and said rollers for guiding said mouth directly into said space, and means for sealing said closed mouth.

32. In an apparatus for closing and sealing paper bottles, the combination, of a pair of coacting stationary elements arranged in spaced parallel relation, means for moving a bottle bodily toward said elements, to introduce its mouth into the space therebetween, for causing the opposite sides of said mouth to be squeezed together consequent upon such introduction, means for sealing said closed mouth, and a bar connected with said bottle-moving means and said sealing means for operating same.

33. In an apparatus for closing and sealing paper bottles, the combination of a pair of coacting stationary elements arranged in spaced parallel relation, means for moving a bottle bodily toward said elements, to introduce its mouth into the space therebetween, for causing the opposite sides of said mouth to be squeezed together consequent upon such introduction, means for sealing said closed mouth, and a manually-actuated member connected with said bottle-moving means and said sealing means for operating same.

34. In an apparatus for closing and sealing paper bottles, the combination of a conveyer, a bottle holder carried thereby, means for operating the conveyer, a pair of coacting squeezing elements beneath which said conveyer and its holder are arranged to pass, means for raising said holder relatively to said conveyer and toward said elements on reaching a position directly beneath the latter, to introduce the mouth of the bottle between said elements and close said mouth by the squeezing action exerted thereon consequent upon such introduction, and means for closing the sealed bottle mouth.

35. In an apparatus for closing and sealing paper bottles, the combination, of means for closing the mouths of the bottles, means for sealing the closed mouths of the bottles, a bottle holder, a member arranged to raise said holder for moving the bottle carried thereby into position to be operated upon by said closing means, a rock shaft to which said member is operatively connected, an arm carried by said shaft, and a bar for operating said sealing means provided with a shoulder adapted to engage said arm and rock said shaft.

36. In an apparatus for closing and sealing paper bottles, the combination, of separate mechanisms for closing and sealing the bottles, means for raising the bottles into position to be operated upon by the closing mechanism, means for operating said bottle-raising means, means for operating the sealing mechanism, and a depressible bar provided with means for initially actuating the first-named operating means and with means for subsequently actuating the second-named operating means.

37. In an apparatus for closing and sealing paper bottles, the combination, of separate mechanisms for closing and sealing the bottles, means for raising the bottles into position to be operated upon by the closing mechanism, means for operating said bottle-raising means, means for operating the sealing mechanism, and a depressible bar provided with a member for actuating the first-named operating means during the first half of its descent and with a separate member for actuating the second-named operating means during the second half of its descent.

38. In an apparatus for closing and sealing paper bottles, the combination, of means for closing the mouth of the bottles, means for sealing the closed mouths of the bottles, a bottle holder, a member arranged to raise said holder for moving the bottle carried thereby into position to be operated upon by said closing means, a rock shaft to which said member is operatively connected, an arm carried by said shaft, a lever for operating said sealing mechanism, and an operating bar provided with separate shoulders adapted to engage and actuate said arm and said lever.

39. In an apparatus for closing and sealing paper bottles, the combination, of means for closing the mouth of the bottles, means for sealing the closed mouths of the bottles, a bottle holder, a member arranged to raise said holder for moving the bottle carried thereby into position to be operated upon by said closing means, a rock shaft to which said member is operatively connected, an arm carried by said shaft, a lever for operating said sealing mechanism, and a depressible operating bar provided adjacent its lower end with a shoulder adapted to engage and actuate said arm and adjacent its upper end with a shoulder adapted to engage and actuate said lever.

40. In an apparatus for closing and sealing paper bottles, the combination, of means for closing the mouths of the bottles, means for sealing the mouths of the closed bottles, a depressible bar, and separate connections between said bar and said closing means and said sealing means for successively operating said closing means and said sealing means when said bar is depressed.

41. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, and a member disposed beneath said carrier and movable into contact with said stem when said carrier reaches a position directly below said elements, to raise said holder and bring said bottle into position to be operated upon by said elements.

42. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, a member disposed beneath said carrier and adapted for vertical movement into contact with said stem when said carrier reaches a position directly below said elements, to raise said holder and bring said bottle into position to be operated upon by said elements, and means for sealing the closed mouth of the bottle.

43. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, a member disposed beneath said carrier and adapted for vertical movement into contact with said stem when said carrier reaches a position directly below said elements, to raise said holder and bring said bottle into position to be operated upon by said elements, and means for centering said carrier in such position.

44. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, a member disposed beneath said carrier and adapted for vertical movement into contact with said stem when said carrier reaches a position directly below said elements, to raise said holder and bring said bottle into position to be operated upon by said elements, means for centering said carrier in such position, and means for sealing the closed mouth of the bottle.

45. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, a member disposed beneath said carrier and adapted for vertical movement into contact with said stem when said carrier reaches a position directly below said elements, to raise said holder and bring said bottle into position to be operated upon by said elements, a rock shaft with which said member is operatively connected, means for sealing the closed mouth of the bottle, and an element connected with said rock shaft and said sealing means for operating same.

46. In an apparatus for closing and sealing paper bottles, the combination, of a pair of coacting elements for closing the mouth of the bottle, a perforated carrier arranged to pass beneath said elements, a bottle holder mounted upon said carrier and having a stem slidable through the perforation therein, a member disposed beneath said carrier and adapted for vertical movement into contact with said stem when said carrier reaches a position directly below said elements, to raise said holder and bring said bottle into position to be operated upon by said elements, a rock shaft with which said member is operatively connected, means for sealing the closed mouth of the bottle, and an operating bar connected with said rock shaft and said sealing means for operating same.

47. In an apparatus of the class specified, the combination, with a frame, of a conveyer movable therein, a series of transversely arranged bottle carriers connected thereto, bottle closing and sealing mechanism disposed in said frame and below which said conveyer and its carriers are arranged to pass, means for operating said mechanism and means connected to said frame and adapted to engage the ends of each carrier as same passes beneath said mechanisms, for centering the bottle with relation thereto.

48. In an apparatus of the class specified, the combination, with a frame, of a conveyer movable therein, a series of transversely arranged bottle carriers connected thereto, bottle closing and sealing mechanisms disposed in said frame and below which said conveyer and its carriers are arranged to pass, means for operating said mechanisms, and spring-pressed members connected to said frame and adapted to engage the ends of each carrier as same passes beneath said mechanisms, for centering the bottle with relation thereto.

49. In an apparatus of the class specified, the combination, with a frame provided with a longitudinal track, of a carrier movable in said frame parallel with said track, a series of transversely-arranged bottle carriers connected to said conveyer and provided at their ends with rollers adapted to travel along said track, bottle closing and sealing mechanisms disposed in said frame and below which said conveyer and its carriers are arranged to pass, and means connected to said frame and adapted to engage the rollers on each carrier as the latter passes beneath said mechanisms, for centering the bottle with relation thereto.

50. In an apparatus for closing and sealing paper bottles, mechanism for closing the mouth of a bottle, in combination with mechanism for sealing said closed mouth, said sealing mechanism comprising means for feeding a metal strip toward said mouth, a reciprocatory element for bending the free end of said strip around said mouth and for subsequently severing the bent end of said strip from the remaining portion thereof, a pair of coacting hollow clamping plungers adapted to engage the severed end of said strip, a pair of coacting punching and riveting dies movable in said plungers, and means for supplying rivets to said riveting dies.

51. In an apparatus for closing and sealing paper bottles, the combination of a traveling bottle holder, a pair of coacting squeezing elements beneath which the holder is arranged to pass, and means for raising said holder on reaching a position directly beneath said elements to introduce the mouth of the bottle into the space between said elements, for closing the bottle mouth by the squeezing action exerted thereon consequent upon such introduction.

52. In an apparatus for closing and sealing paper bottles, the combination of a traveling bottle holder, a pair of coacting squeezing elements beneath which the holder is arranged to pass, means for arresting the holder on reaching a position directly beneath said elements to center the holder relative to the latter, and means for raising the holder when in such position to introduce the mouth of the bottle into the space between said elements, for closing the bottle mouth by the squeezing action exerted thereon consequent upon such introduction.

53. In an apparatus for closing and sealing paper bottles, the combination of a traveling bottle holder, a pair of coacting squeezing elements beneath which the holder is arranged to pass, means for raising said holder on reaching a position directly beneath said elements to introduce the mouth of the bottle into the space between said elements, for closing the bottle mouth by the squeezing action exerted thereon consequent upon such introduction, and means interposed between said raising means and said elements for guiding the mouth of the bottle into said space.

54. In an apparatus for closing and sealing paper bottles, a pair of coacting spaced elements for squeezing the mouths of the bottles together at opposite sides to close the same, one of said elements being fixed and the other movable, means for moving a bottle bodily endwise toward said elements to force its mouth into the space therebetween, and means for sealing the closed mouth of the bottle.

55. In an apparatus for closing and sealing paper bottles, a pair of coacting spaced elements for squeezing the mouths of the bottles together at opposite sides to close the same, one of said elements being fixed and the other movable, means for moving a bottle bodily endwise toward said elements to force its mouth into the space therebetween, means for sealing the closed mouth of the bottle, and a common operating element connected with said first and second named means.

In testimony whereof I hereunto affix my signature in the presence of two witnesses.

JOHN L. ZEILER.

Witnesses:
 GEORGE G. ANDERSON,
 BERTHA VON BEHRENS.